United States Patent [19]
Kriofsky et al.

[11] 3,859,624
[45] Jan. 7, 1975

[54] INDUCTIVELY COUPLED TRANSMITTER-RESPONDER ARRANGEMENT

[76] Inventors: Thomas A. Kriofsky, 7341 Padova Dr., Goleta, Calif. 93017; Leon M. Kaplan, 1121 E. Cabrillo Blvd., Santa Barbara, Calif. 93103

[22] Filed: Sept. 5, 1972

[21] Appl. No.: 286,306

[52] U.S. Cl. .......... 340/38 L, 340/152 T, 343/6.5 R, 343/6.5 SS, 343/6.8 R
[51] Int. Cl. .......... G08g 1/00, G01s 9/56
[58] Field of Search .......... 340/152 T, 38 L, 149; 343/6.5 R, 6.5 SS, 6.8 R, 6.5 LC, 6.8 LC

[56] References Cited

UNITED STATES PATENTS

| | | | |
|---|---|---|---|
| 3,311,915 | 3/1967 | Mori | 343/6.5 SS |
| 3,362,025 | 1/1968 | Mori | 343/6.5 SS |
| 3,406,391 | 10/1968 | LeVon, Jr. | 343/6.5 SS |
| 3,427,614 | 2/1969 | Vinding | 343/6.5 SS |

*Primary Examiner*—Maynard R. Wilbur
*Assistant Examiner*—G. E. Montone
*Attorney, Agent, or Firm*—Don B. Finkelstein

[57] ABSTRACT

An inductively coupled interrogator-responder arrangement having two dimensional and limited three dimensional capability. An interrogator means having AC power field generating capability and uniquely coded information field receiving capability may be positioned at a known location such as in a preselected position in a roadway. The interrogator generates an AC power field in regions adjacent thereto. A responder tag means may be positioned on, for example, vehicles. The responder tag may be completely passive, that is, receiving its power from the AC power field generated by the interrogator. As the vehicle approaches the interrogator unit power is received by the responder tag through inductive coupling and the responder tag generates an uniquely coded information field unique to the particular responder tag on the vehicle. The uniquely coded information field is inductively coupled into the uniquely coded information field receiving portion of the interrogator and an information signal is generated in the interrogator having an information content corresponding to the particular code in the uniquely coded information field. In embodiments where the responder tag is self-powered, the interrogator means does not generate an AC power field and the inductive coupling between the responder tag means and the interrogator means is limited to the inductive coupling of the uniquely coded information field generated in the responder tag and received by the interrogator means.

19 Claims, 23 Drawing Figures

PATENTED JAN 7 1975

3,859,624

SHEET 02 OF 14

PATENTED JAN 7 1975 3,859,624

SHEET 12 OF 14

INDUCTIVELY COUPLED TRANSMITTER-RESPONDER ARRANGEMENT

BACKGROUND OF THE INVENTION

Field of the Invention

This invention relates to the identification art and more particularly to an improved interrogator-responder arrangement for providing an unique identification of a responder tag that may be positioned, for example, on a vehicle moving in proximity to the interrogator.

Reference to Related Applications

This invention constitutes an improvement on the invention described and claimed in our copending patent application Ser. No. 72,483, now U.S. Pat. No. 3,689,885 filed Sept. 15, 1970.

Description of the Prior Art

In the above-identified copending application there is described an interrogator-responder arrangement utilized for identification of various objects such as baggage, vehicles, or the like. The invention so described and claimed in the above-identified patent application is directed primarily to an interrogator-responder arrangement having three dimensional capability and in which the responder tag is entirely passive. There is also described and claimed therein other embodiments in which an embodiment having two dimensional with limited three dimensional identification capability is provided.

The present invention is directed primarily towards an improvement in the electronic components and circuitry of the responder tag and the interrogator means and the improved circuitry and components may equally well be utilized, as desired, in the structure defined and claimed in the above-identified patent application. In the present invention, however, the interrogator-responder tag arrangement is exemplified by a system in which there is provided two dimensional and limited three dimensional identification capability utilizing the improved circuity and components therein. This embodiment of the present invention is particularly adaptable to, for example, the identification of vehicles such as automobiles, buses, trucks, freight cars, or the like, traveling in comparatively known paths past fixed installations.

SUMMARY OF THE INVENTION

Accordingly, it is an object of the present invention to provide an improved interrogator-responder tag arrangement.

It is another object of the present invention to provide an improved responder tag for generating an unique coded information field.

It is another object of the present invention to provide an improved interrogator for generating an AC power field.

It is yet another object of the present invention to provide an improved interrogator for receiving an inductively coupled uniquely coded information field generated in the responder tag and generating an information signal having an information content corresponding to the uniquely coded information field.

It is a further object of the present invention to provide an improved interrogator-responder identification system arrangement in which the capability exists to couple power inductively into the responder tag and couple inductively an uniquely coded information signal generated in the responder tag to the interrogator.

It is yet a further object of the present invention to provide an interrogator-responder tag identification system having a responder tag capability for generating a very large number of unique code combinations in a small size in form amenable to mass production.

The above and other objects of the present invention are achieved, according to one embodiment thereof, in an interrogator-responder tag arrangement having two dimensional and limited three dimensional capability. It will be appreciated that the utilization of such a structure as an embodiment of the present invention is not limiting thereon. Rather, of course, the structural components of the present invention may equally well be utilized in full three dimensional embodiments to provide such detection and identification. Therefore, the selection of a two dimensional with limited three dimensional capability arrangement is merely illustrative of the principals of the present invention.

In such a preferred embodiment an interrogator means may be positioned at a known point on, for example, a roadway. The interrogator, in this embodiment, has the capability for both generating an AC power field in regions adjacent thereto and for receiving an uniquely coded information field from a responder tag in proximity thereto. Both the transmission of the AC power field to the responder tag and the transmission of the uniquely coded information field from the responder tag to the interrogator is by inductive coupling.

The interrogator means has a power supply for providing a source of controlled electric energy. The power supply may be, for example, a battery or a source of AC electric energy. The controlled energy is utilized to power the various components of the interrogator means.

A power signal-time base generator means which comprises a phase locked loop self-timed at a first frequency receives the controlled electric energy from the power supply and generates an AC power signal in response thereto. The AC power signal is a self-timed phase locked power signal and is transmitted to a power field generator means. The power field generator means may comprise a coil embedded a preselected distance beneath the surface of the roadway and may, typically, have dimensions on the order of two feet by eight feet. These dimensions, of course, are merely illustrative and the coil may be either larger or smaller as desired for particular applications. The coil, then, receives the self-timed phase locked power signal and generates an AC power field in regions adjacent thereto. In this embodiment of the invention the responder tag is passive and receives its power from the AC power field that is generated in the interrogator by inductive coupling. The responder tag has a first coil for receiving the AC power field and provides DC tag power signals in response to the reception thereof. Thus, the responder tag, being entirely passive, only generates the uniquely coded information field in response to the presence of the AC power field. The DC tag power signals are received by a code signal time base generator means which generates a code time base signal at a preselected code clock frequency.

A code signal generator means is powered by the DC tag power signals and receives the code time base signal and repetitively generates an uniqued clocked code signal. The unique clocked code signal is clocked at the preselected code clocked frequency of the code time base signal. A code information signal and time base generator means is also powered by the DC tag power signals and receives the unique clocked code signal and generates, in response thereto, a self-clocking coded information signal that is unique to the particular responder tag. The self-clocking coded information signal is fed into a coded information field generator, which, in this embodiment of the present invention, comprises a second tag coil and the uniquely coded information field is generated in the second coil in response to the presence of the self-clocking coded information signal.

The uniquely coded information field is inductively coupled into a coded information field receiver of the interrogator. In this embodiment of the present invention a single coil is utilized, sequentially, to provide both the AC power field when operating in a first mode and for receiving the uniquely coded information field when operating in a second mode. Switching between the two modes is automatically done in the interrogator. Thus, the interrogator sequentially operates between the first mode comprising the generation of the AC power field and a second mode comprising receiving the uniquely coded information field from the responder tag.

The interrogator comprises suitable circuitry for proper validation of the uniquely coded information field and generating the information signal having an information content corresponding thereto. The information signal may then be utilized on any type of display such as, for example, a digital display, stored on magnetic tape for subsequent computer use, or the like.

In other embodiments of the present invention wherein electric energy is available at the responder tag, the interrogator does not generate an AC power field for inductive coupling into the responder tag. Rather, the responder tag is self-powered and may, if desired, continuously generate the uniquely coded information field for inductive coupling into the interrogator means operating continuously in the second mode.

BRIEF DESCRIPTION OF THE DRAWING

The above and other embodiments of the present invention may be more fully understood from the following detailed description taken together with the accompanying drawings wherein similar reference characters refer to similar elements throughout and in which.

DESCRIPTION OF THE PREFERRED EMBODIMENTS

Figures 1, 3:
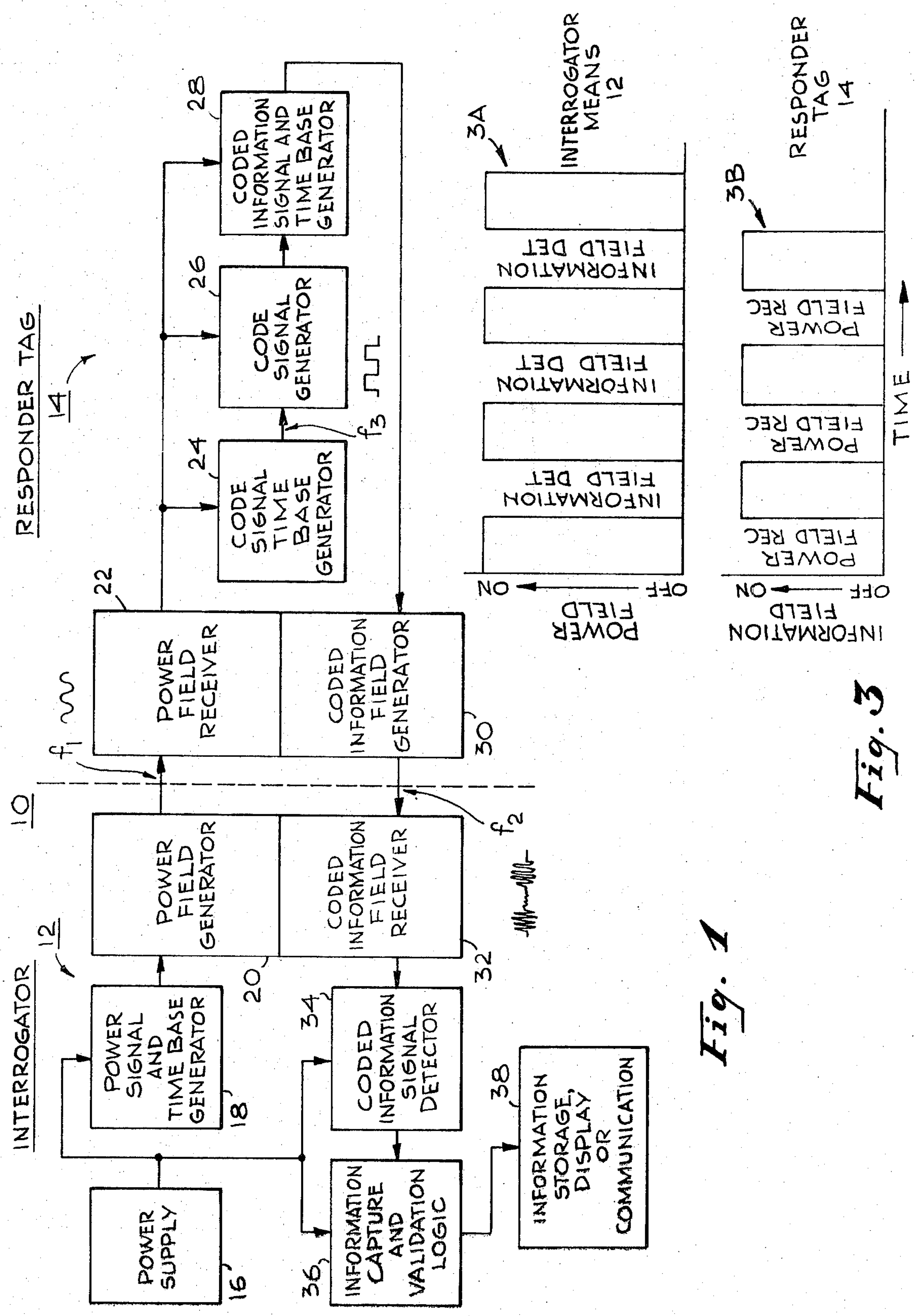
FIG. 1 is a block diagram of one embodiment of the present invention.
FIG. 3 is a graphical representation of the characteristics of the interrogator means shown in FIG. 1.

Referring now to FIG. 1 there is shown, in block diagram form, the general arrangement of one embodiment, generally designated 10, of a preferred form of an interrogator means 12 and responder tag 14 according to the principals of the present invention. The interrogator means 12, in this embodiment of the present invention, establishes an AC power field at a first frequency, shown on FIG. 1 as $f1$ for inductive coupling into the responder tag 14 and also received an uniquely coded information field which is inductively coupled with the responder tag 14 into the interrogator means 12 at a second frequency shown on FIG. 1 as $f2$. The interrogator means 12 also generates an output signal in response to the presence of a detected uniquely coded information field.

The responder tag 14 is positionable in AC power field and uniquely coded information field energy exchange relationship by, for example, inductive coupling, to the interrogator means 12 and receives the AC power field at frequency $f1$ generated in the interrogator means 12 and generates the uniquely coded information field at the frequency $f2$ in response thereto.

The interrogator means 12 of the embodiment 10 shown on FIG. 1 is generally comprised of a power supply 16 for generating a controlled source of electric energy utilized to provide the basic power for the interrogator means 12. A power signal and time base generator means 18 is powered by the controlled electric energy generated in the power supply 16 and generates an AC power signal for transmission to a power field generator means 20. In the embodiment 10 shown on FIG. 1 it is preferred that the power signal and time base generator generally comprise a phase locked loop self-timed at the first frequency $f1$ and, therefore, the AC power signal generated in the power signal time base generator 18 comprises a self-timed phase locked power signal at the first frequency $f1$.

The power field generator means 20 receives the self-timed phase locked power signal and generates the AC power field at the first frequency in response thereto. The power field generator means 20, in the embodiment 10 shown on FIG. 1, may generally comprise an induction coil that is utilized to generate the AC power field within inductive coupling range of the responder tag 14.

When a responder tag 14 is within AC power field energy exchange relationship to the interrogator means 12 the AC power field is inductively coupled into a power field receiver means 22 of the responder tag 14. The power field receiver means 22 may comprise a high permeability coil means for the inductive coupling to extract energy from the AC power field provided by the power field generator 20. The power field receiver means 22 also generates DC responder tag power signals in response to the presence of the AC power field inductively coupled thereto. The DC responder tag power signals generated in the power field receiver means 22 are utilized to provide the power for the responder tag 14. In this embodiment 10 of the present invention as shown on FIG. 1 responder tag 14 is passive and all power into the responder tag 14 is received from the AC power field inductively coupled thereto from the power field generator 20 of the interrogator means 12.

The responder tag 14 also comprises a code signal time base generator means 24 powered by the DC tag power signals generated in the power field receiver means 22 and the code signal time base generator means 24 generates a code time base signal at a code clock or third frequency $f3$. If desired, the third frequency of the code time base signal generated by the code signal time base generator 24 may be the same as the first frequency of the AC power field generated by the power field generator means 20 of the interrogator 12, for example, 50 kiloHertz.

In the embodiment of the invention 10 shown on FIG. 1 it is preferred that the responder tag 14 be self-clocking, or self-synchronizing. As described below in greater detail, no specific phase or frequency relationship must be maintained between the AC power field generated by the power field generator means 20 of the interrogator means 12 and the uniquely coded information field generated in the responder tag 14.

The code time base signal at the third frequency is coupled into a code signal generator means 26 that is also powered by the DC tag power signals generated in the power field receiver means 22. The code signal generator means 26 may be an integrated circuit comprising a metal oxide semiconductor multiplexer, a complimentary metal oxide semiconductor multiplexer, silicon on sapphire semiconductor multiplexer or the like. That is, it should provide a high information bit capability in a comparatively small volume and utilizing comparatively small amounts of power. The code signal generator 26 generates a code that is unique to the particular responder tag and the code signal itself is comprised, generally, of a binary notation code, for example, in which there is provided a plurality of bits corresponding to each information digit. A first portion of the plurality of bits are utilized as a synchronization or keying portion of the code signal, a second portion as a parity portion and the remaining bits in the code signal define, in binary terms in this embodiment, an information signal portion that is unique to the particular responder tag.

The code signal generator 26 generates the unique clocked code signal that is clocked at the third frequency of the code time base signal generated in the code signal time base generator 24. The unique clock code signal generated in the code signal generator means 26 is repetitively generated during a predetermined time interval after an AC power field has been received by the power field receiver means 22 and before the next receipt of an AC power field. Thus, the responder tag 14 is cyclically operable in a first mode comprising an AC power field receiving mode and a second mode comprising an uniquely coded information field generating mode.

The repetitively generated unique clocked code signal generated in the code signal generator 26 is coupled into a coded information signal and time base generator means 28 that is also powered by the DC tag power signals generated in the power field receiver means 22. The coded information signal and time base generator means 28 receives the unique clocked code signal and generates a self-clocking coded information signal that is also unique to the particular responder tag 14 in response thereto. The self-clocking coded information signal generated by the coded information signal and time base generator means 28 has a frequency $f2$ and modulates the code time base signal. In the embodiment 10 shown on FIG. 1 the frequency $f2$ may be, for example, on the order of 500 kiloHertz and is modulated by the code time base signal at frequency $f3$ by amplitude modulation. The self-clocking coded information signal generated in the coded information and time base generator 28 is coupled into a coded information field generator 30 which, for example, may comprise an induction coil coplanar with the induction coil of the power field receiver means 22. The coded information field generator generates the uniquely coded information field in regions adjacent the interrogator means 12 for inductive coupling thereto.

The interrogator means 12 also comprises a coded information field receiver means 32 for receiving the uniquely coded information field generated by the coded information field generator means 30 of the responder tag 14 and may, for example, comprise the same coil means utilized as the power field generator means 20 or, in other embodiments, may comprise a separate coil. The coded information field receiver means 32, upon receipt of the coded information field, generates an uniquely coded information signal therein which is detected by a coded information signal detector means 34. The coded information signal detection means 32 is also powered by the power supply 16 and generates a detected coded signal in response to the presence of the coded information signal in the coded information field receiver means 32. The detected coded signal generated in the coded information signal detector means 34 is coupled into an information capture and validation logic means 36 which is also powered by the controlled electric energy from the power supply 16. The information and capture validation logic means 36 receives the detected coded signal from the coded information signal detector means 34 and generates an output signal having an information content corresponding to the uniquely coded information field generated by the coded information field generator 30 of the responder tag 14. The output signal from the information capture and validation logic means 36 may be utilized to indicate the code corresponding to the responder tag 14 in any desired manner. For example, it may be stored on magnetic tape for utilization in a computer, it may be presented in a visual display or it may be transmitted elsewhere for subsequent utilization, as shown by the information storage display or communication means 38.

Figures 2, 7:
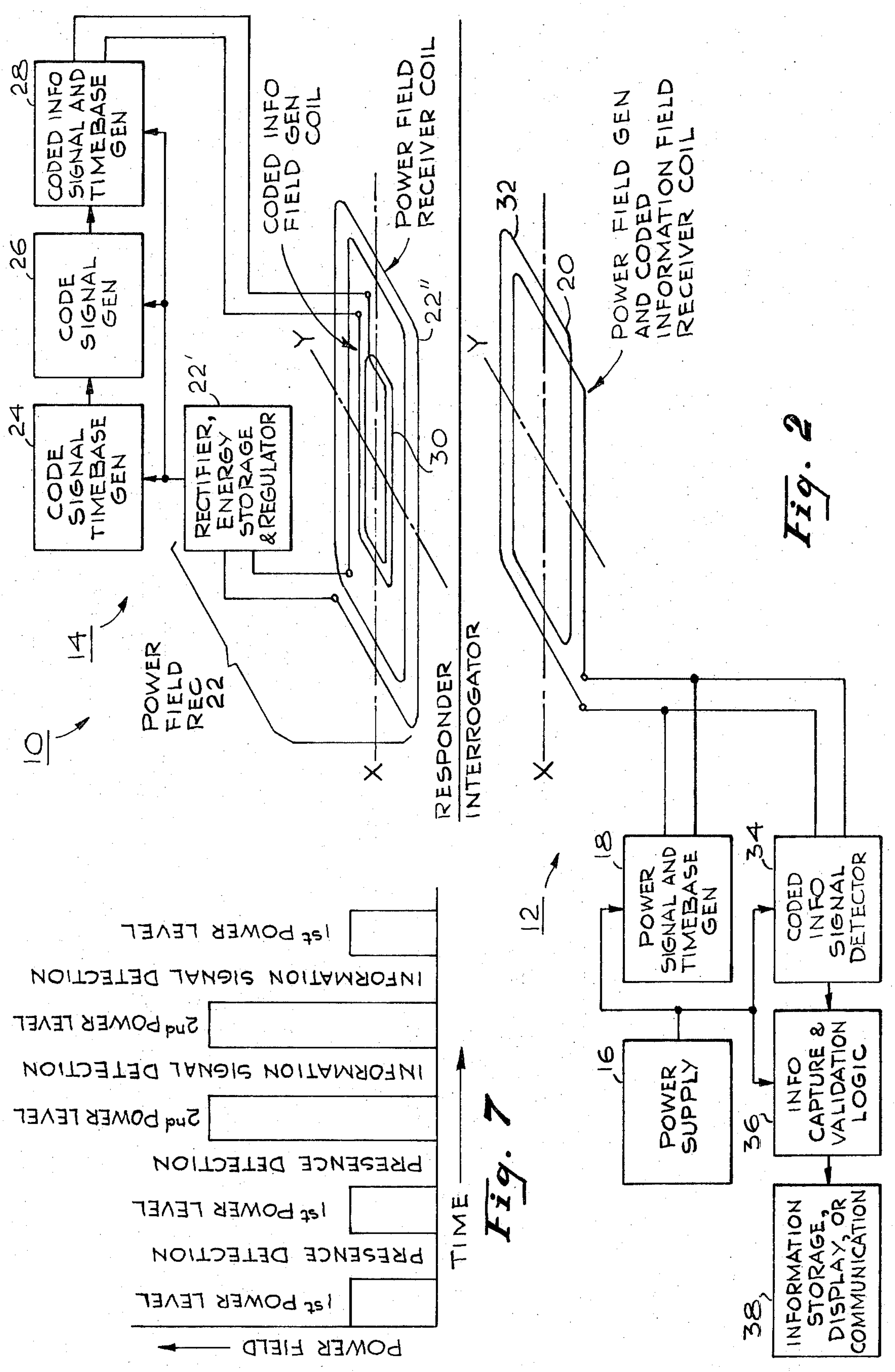
FIG. 2 is a block diagram partly in pictorial form of the embodiment of the invention illustrated in FIG. 1.
FIG. 7 is a graphical representation of the characteristics of the interrogator means shown in FIG. 6.

FIG. 2 is a pictorial illustration, partially in block diagram form, of the embodiment 10 of the invention shown on FIG. 1. As can be seen from FIG. 2, the power field receiver 22 and coded information field generator 30 of the interrogator means 12 comprise an unitary coil. In one application of the present invention this coil may be installed beneath the surface of a roadway in a substantially horizontal plane. The responder tag 14, in this application, may be installed, for example, on the underside of a vehicle as a taxi cab, police car, bus, or any other type of vehicle adapted to traverse the roadway and incorporates two separate coils. The power field receiver coil is part of the power field receiver 22 which also comprises a rectifier energy storage and regulator portion 22'. A separate coil 30 comprises the coded information field generator 30. These two coils are substantially coplanar. When the responder tag 14 is in inductive coupling energy transfer relationship to the interrogator means 12 energy may be transferred from the power field generator coil 20 to the power field receiver coil portion 22'' of the power field receiver 22 on the responder tag 14. The responder tag 14 then generates the coded information field in the coded information field generator 30 for inductive coupling into the coded information field receiver coil 34 of the interrogator means 12.

In the embodiment 10 of the present invention, since an unitary coil is utilized for both the power field generator 20 and the coded information field receiver 32 in the interrogator means 12, the interrogator means 12 is sequentially and cyclically operable in a plurality of modes. A first mode comprises an AC power generating mode in which the AC power field is generated in the power field generator 20. A second mode comprises an uniquely coded information field receiver mode for receiving the uniquely coded information field from the responder tag 14. FIG. 3 is a graphical representation of the cyclic operation of the interrogator means 12 and responder tag 14 in the two modes of operation. As shown on Curve 3A the power field is on for a given time period which, for example, may be a few milliseconds and then, as described below in greater detail, switched off. During the off period as shown by Curve 3B an uniquely coded information field that may be present due to the proximity of a responder tag 14 is detected. As described below in greater detail, when a valid uniquely coded information field is received, the interrogator 12 operates in the second mode until the valid transmission thereto is ended.

Figures 4, 10:
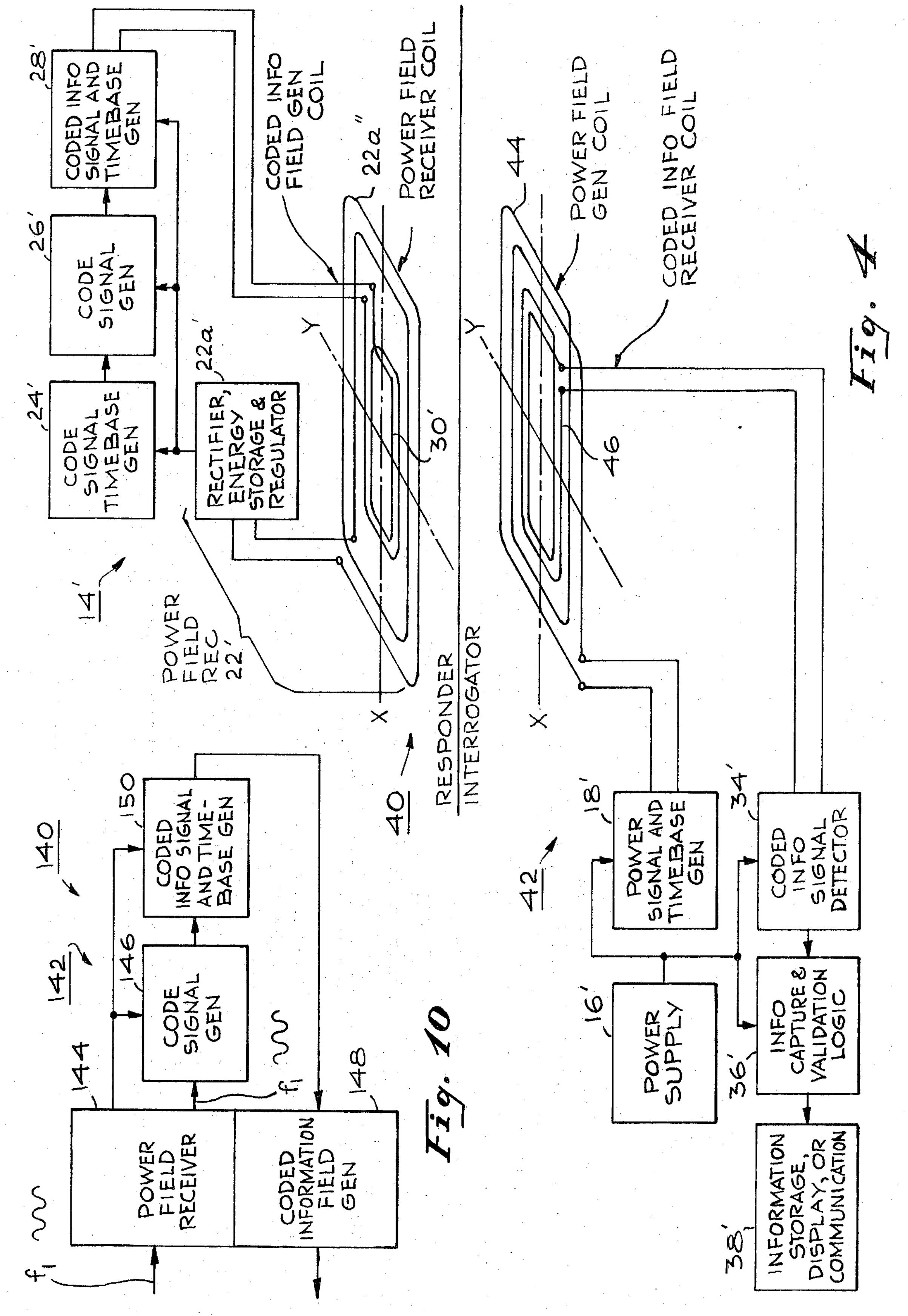
FIG. 4 is a block diagram, partly in pictorial form, of another embodiment of the present invention.
FIG. 10 is a block diagram of another responder tag embodiment useful in the practice of the present invention.

FIG. 4 illustrates another embodiment of the present invention generally designated 40. The responder tag 14' in the embodiment 40 may be similar to the responder tag 14 shown in FIGS. 1 and 2 except that the uniquely coded information field is continuously generated during the time that the AC power field is received. However, the interrogator means 42 is provided with two separate coils. A first of these coils may be the power field generator coil 44 in which the AC power field for transmission to the responder tag 14 is generated in the manner similar to that described above in connection with FIGS. 1 and 2. A second coil 46 comprises a coded information field receiver coil for receiving the uniquely coded information signal from the responder tag 14. The remaining structure of the interrogator means 42 may be similar to the interrogator means 12 except that, if desired, in this embodiment 40 of the present invention the two modes of operation of the interrogator means 42 may be carrried on simultaneously. That is, the AC power field may be continuously generated in the power field generator coil 44 and the coded information signal detector 34' may continuously monitor the detection of any signal that may be present in the coded information field receiver coil 46 as induced by the inductive coupling of the uniquely coded information field thereto from the coded information field generator coil 30' of the responder tag 14'.

In the embodiments 10 and 40 of the present invention described above, the power for operation of the responder tag was inductively coupled thereto from the interrogator means. It will be appreciated, however, that the responder tag may be self-powered. For example, where power may be available such as in a vehicle, the responder tag may receive its power from the electric energy source contained within the vehicle.

Figure 5:
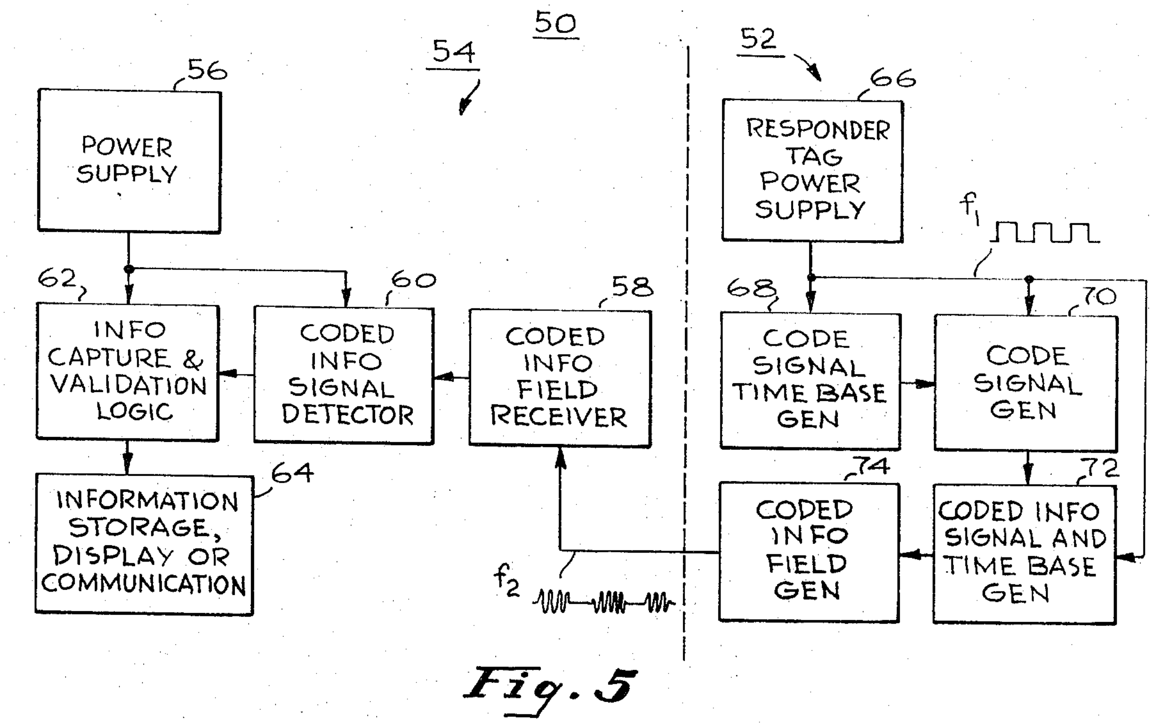
FIG. 5 is a block diagram form of another embodiment of the present invention.

FIG. 5 illustrates an embodiment generally designated 50 of the present invention wherein the responder tag 52 is self-powered and does not require the transmission thereto of electrical energy from the interrogator means 54. The interrogator means 54 is provided with a power supply 56, which may be similar to the power supply 16 described above, and also incorporates a coded information field receiver 58, a coded information signal detector 60, an information capture validation logic means 62 and an information storage display or communication means 64 all of which may be substantially similar to the coded information field receiver 32, coded information signal detector means 34, information capture validation logic means 36 and information storage, display or communication means 38 described above.

The responder tag 52 is provided with a responder tag power supply means 66 for generating DC tag power signals and may receive its energy from the electrical energy source of, for example, a vehicle (not shown) comprising a battery. The responder tag 52 is also provided with a code signal time base generator means 68, a code signal generator means 70, a coded information signal and time base generator 72 and a coded information field generator 74 all of which may be similar, respectively, to the code signal time base generator 24, code signal generator 26, coded information signal and time base generator 28 and coded information field generator 30 described above.

In this embodiment 50 of the present invention the responder tag 52 may continuously generate the unique coded information signal at the frequency *f*2, for example 500 kHz, for inductive coupling it to the coded information field receiver 58 of the interrogator means 54. The code signal time base generator 68 of the responder tag 52 generates the code time base signal at the code clock frequency shown as *f*1 on FIG. 5, as described above, which may be on the order of 50 kHz. The interrogator means 54, in this embodiment 50 of the present invention, may continuously operate in the above-mentioned second mode of operation comprising the uniquely coded information field receiver mode for receiving through inductive coupling the uniquely coded information field from the responder tag 52.

Figure 6:
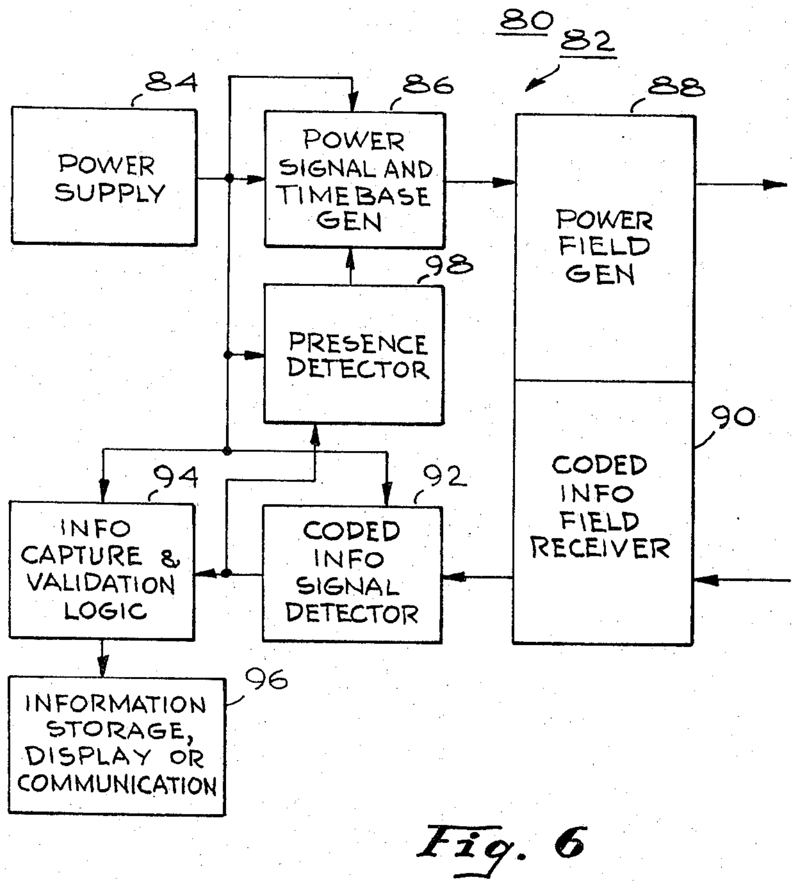
FIG. 6 is a block diagram of an interrogator means useful in the practice of the present invention.

FIG. 6 illustrates another embodiment generally designated 80 of a interrogator means 82 useful in the practice of the present invention. In this embodiment 80 there is provided in the interrogator means 82 a power supply 84 which may be similar to the power supply 16 described above, a power signal and time base generator means 86 which may be similar to the power signal time base generator 18 described above, and a power field generator 88 which may be similar to the power field generator 20 described above. There is also provided a coded information field receiver 90 which may be similar to the coded information field receiver 32 described above, a coded information signal detector 92 which may be similar to the coded information signal detector 34 described above, an information capture and validation logic means 94 which may be similar to the information capture and validation logic means 36 described above and an information storage display or communication means 96 which may be similar to the information storage display or communication means 38 described above.

However, in this embodiment 80 of the interrogator means 82 there is also provided a presence detector 98 that is powered by the power supply 84 and receives the detected coded signal from the coded information signal detector 92 and transmits a presence detection signal to the power signal and time base generator means 86. The presence detector is utilized to detect the presence of, for example, a vehicle approaching the interrogator means 82. It is not utilized, in this embodiment 80 of the interrogator means 82 just to detect the presence of a responder tag. Thus, the presence detector 98 may comprise a vehicle treddle such as those commonly utilized to actuate traffic control lights, it may comprise a radar type system, an ultra sonic type system or any other type system for detecting the approach of a vehicle which may incorporate a responder tag.

In this embodiment 80 of the interrogator means 82 the first mode of operation thereof which comprises the AC power generating mode comprises a first power level condition for generating the AC power field at a comparatively low power level when there is not detected the presence of an approaching vehicle. FIG. 7 illustrates the cycle of operation of the interrogator means 82. After each cycle of the first power level mode there is a presence detection mode of operation for determining the presence of an approaching vehicle. When the presence detector 98 detects the presence of an approaching vehicle the interrogator means 82, in its first mode of operation, is automatically switched to a second power level condition in which the AC power field is generated at a comparatively high power level. For the interrogator means 82 operating in the second power level condition of the first power mode it is cyclically switched between the second power level condition and an information signal and detection mode of operation in which the information field generated by an adjacent responder tag is detected. The interrogator means 82 may continue to cyclically switch between the second power level condition of the first operating mode and the information signal detection mode for a fixed time period after the detection of an approaching vehicle or, if desired, until no information signal is received by the coded information field receiver 90. In any event, the interrogator means 82, after the responder tag has passed the location thereof reverts back to the first power level condition during the first mode of operation.

A responder tag such as the responder tag 14 described above may be utilized in this embodiment 80 of the present invention. It has been found that the interrogator means 82 is particularly useful where the power supply 84 comprises a battery in order to conserve the electrical energy of the battery when generating the AC power field.

Figure 8:
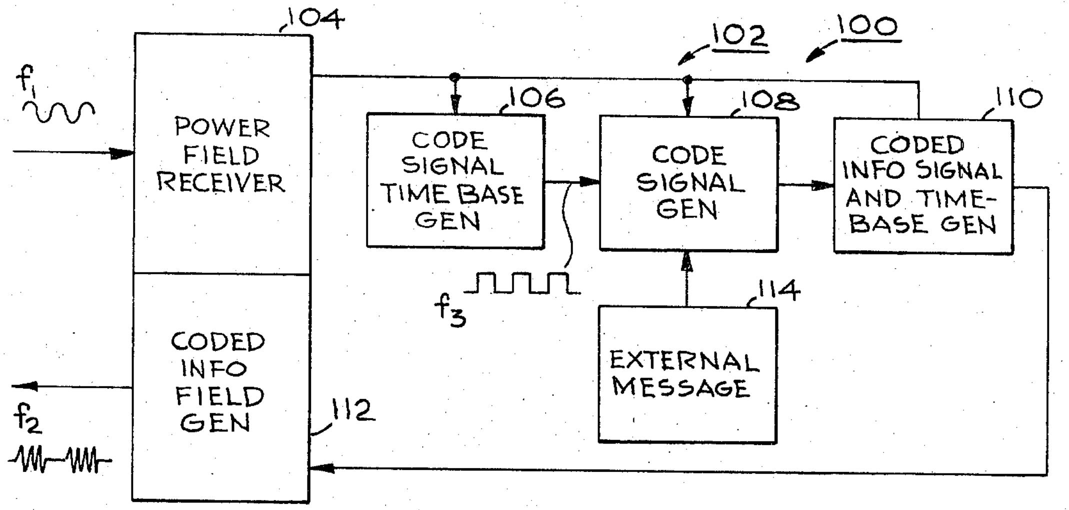
FIG. 8 is a block diagram of another embodiment of a responder tag useful in the practice of the present invention.

FIG. 8 illustrates another embodiment generally designated 100 of the present invention comprising a responder tag 102. The responder tag 102 is provided with a power field receiver means 104 which may be similar to the power field receiver means 22 described above, a code signal time base generator means 106 which may be similar to the code signal time base generator means 24 described above, a code signal generator 108 which may be similar to the code signal generator 26 described above, a coded information signal and time base generator means 110 which may be similar to the coded information signal and time base generator means 28 described above and a coded information field generator 112 which may be similar to the coded information field generator means 30 described above. The responder tag 102 is also supplied with an external message means 114 which generates a signal for transmission to the code signal generator means 108. The external message means 114 may comprise some type of variable message that is to be included in the uniquely coded information field generated by the coded information field generator 112 for inductive coupling into an interrogator means. For example, the external message may comprise the destination of a taxi cab or police car, the number of passengers or other desired indicia of a bus, or the like. The external message is impressed into the code signal generator and may be considered as part of the uniquely coded information field that is transmitted to the interrogator means. The external message means 114 may be powered by its own power source such as the source of energy in the vehicle or, alternatively, it could draw power from the power field receiver 104. The external message means 114 may also be used, for course, in the responder tag embodiment 52 described above where in the responder tag is self-powered.

Figure 9:
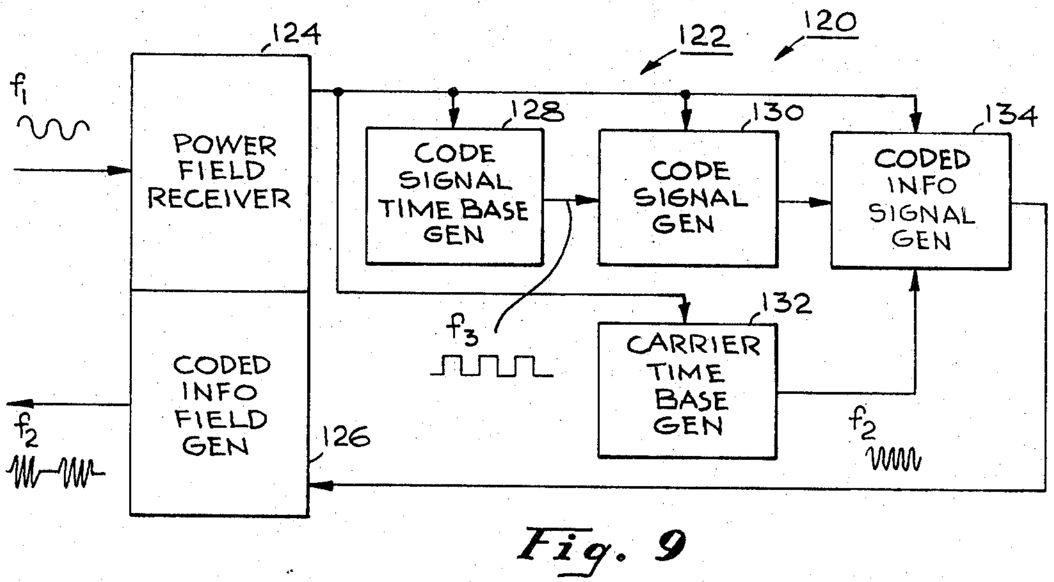
FIG. 9 is a block diagram of another responder tag embodiment useful in the practice of the present invention.

FIG. 9 illustrates another embodiment 120 of a responder tag 122 useful in the practice of the present invention. The responder tag 102 is provided with a power field receiver means 124 which may be similar to the power field receiver means 22 described above for generating DC tag power signals upon receipt of an AC power field at a frequency *f1*. A coded information field generator means 126, which may be similar to the coded information field generator 30 described above, is provided for generating the uniquely coded information field at the frequency *f2* for inductive coupling into an appropriate interrogator means.

A code signal time base generator 128 generates a code time base signal at a third frequency *f3* that is supplied to a code signal generator means 130. The code signal generator means 130 generates the unique clocked code signal, clocked at the frequency *f3* of code time base signal.

Carrier time base generator 132 is provided in this embodiment 120 of the responder tag 122 for generating a carrier time base signal at the frequency *f2*. The carrier time base generator signal at the frequency *f2* is coupled into the coded information signal generator 134 which also receives the unique clocked code signal from the code signal generator 130. Thus, in the responder tag 122 the carrier time base signal frequency *f2* is generated independently from the coded information signal generator 134 and the carrier time base signal at the frequency *f2* is modulated, for example by amplitude modulation, by the code signal generator 130 output signal comprising the unique clocked code signal in the coded information signal generator 134. It will be appreciated that the responder tag 122 may be useful in the practice of many embodiments of the present invention described above and the utilization of a separate carrier time base generator means may be incorporated into, for example, the responder tag 52 described above wherein the responder tag is self-powered.

FIG. 10 illustrates another embodiment generally designated 140 of a responder tag 142 useful in the practice of the present invention and is provided with a power field receiver means 144 for receiving an AC power field by inductive coupling thereto from an appropriate interrogator means and at a frequency *f1* that may be similar to the power field receiver means 22 described above. A code signal generator 146, which may be similar to the code signal generator 26 described above, is provided. However, in this embodiment of the present invention, the code signal time base frequency is derived directly from the frequency *f1* of the AC power field and is coupled into the code signal generator means 146. This embodiment 140 of the responder tag 142 requires fewer electronic components in the responder tag but limits the code signal time base frequency to be equal to or less than the frequency *f1* of the power field. This limitation thereby limits the information transmission rate in the uniquely coded information field generated by the coded information field generator 148 in response to the presence thereof of a self-clocking coded information signal from the coded information signal time base generator means 150, which may be similar to the coded information and time base generator means 28 described above. It will be appreciated that this simplification of the responder tag 142 may be utilized in many of the embodiments of the present invention as required.

Figure 11:
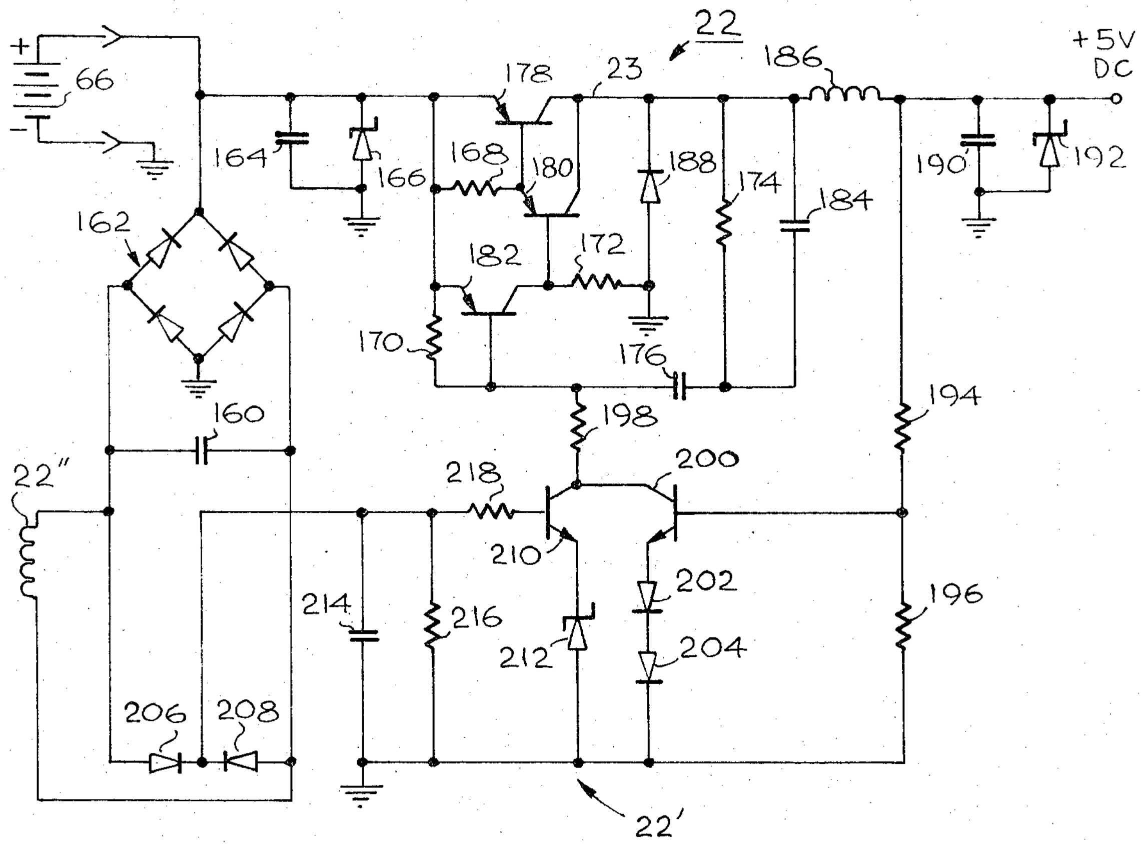
FIG. 11 is a schematic diagram of a power field receiver means useful in the practice of the present invention.

FIG. 11 illustrates a schematic diagram of the power field receiver means 22 of the responder tag 14 described above. As shown in FIG. 11 there is a power field receiver coil 22'' portion of the power field receiver means 22 and a rectifier energy storage and regulator portion 22' thereof.

If the power field receiver coil 22'' is omitted and it is desired to provide a self-powered responder tag, such as the responder tag means 52 described above, then a source of electrical energy, such as the battery 66 comprising a responder tag power supply may be incorporated as shown to provide energy to the responder tag for generation of the DC tag power signal.

When the power field receiver coil 22'' is utilized to receive an AC power field transmitted thereto by inductive coupling, an AC voltage is induced therein. Capacitor 160 is connected in parallel with the power field receiver coil 22'' and tunes the power field receiver coil 22'' near resonance at the frequency *f1* of the AC power field transmitted thereto which, for example, may be on the order of 50 kiloHertz. The AC voltage generated across the power field receiver coil 22'' is applied to the full wave bridge rectifier 162 which produces a DC voltage. The DC voltage charges the energy storage capacitor 164 and zener diode 166 across capacitor 164 limits the maximum voltage to which capacitor 164 can be charged in order to prevent over voltage of the electrical components.

The rectifier, energy storage and regulator portion 22' of the power field receiver 22 incorporates an oscillator section, generally designated 23 generally comprised of resistors 168, 170, 172 and 174, capacitor 176 and transistors 178, 180 and 182. Capacitor 184 provides a high frequency compensation for the oscillator operation. Inductive coil 186 provides an inductive filter for the output voltage of the oscillator.

Diode 188 is utilized as a commutating diode to eliminate voltage spikes which may be destructive to transistors 178 and 180. Capacitor 190 provides an energy storage source for the DC output voltage of the filter 186. Zener diode 192 limits the DC output voltage comprising the DC tag power signal to a maximum of +5 volts DC and thus prevents overvoltage conditions in the responder tag.

Resistors 192 and 194 operate as a voltage divider for the DC output voltage in order to provide feedback control for the oscillator section 23 by varying the current passing through resistor 198, transistor 200, diode 202 and diode 204. This variation of the current varies the duty cycle of the oscillator section 23 and provides the desired switching regulation.

The AC voltage generated across power field receiver coil 22'' is also applied to diodes 206 and 208. As long as the voltage appearing at the cathodes of diodes 206 and 208 is above a predetermined voltage level, as determined by the base to emitter voltage drop of transistor 210 and Zener voltage of Zener diode 212, the oscillator 23 in the switching regulator is inhibited from operation by forcing transistor 182 to be turned "on". When transistor 182 is turned "on", transistor 178 is forced to be turned "off" and removes power from the +5 volt DC power line and thus prevents generation of DC tag power signals. Therefore, during the time interval when the AC power field is being received in power field receiver coil 22'', capacitor 164 is allowed to charge without any load and the remainder of the responder tag 14 electronics is inhibited from operation. During the time interval when no AC power is being received by the power field receiver coil 22'' the voltage generated across power field receiver coil 22″ and thus at the cathodes of diodes 206 and 208 drops to zero and permits capacitor 214 to discharge through resistors 216 and 218, transistor 210 and Zener diode 212 until transistor 210 is forced to turn "off" after a predetermined time delay. When transistor 210 turns "off" the oscillator 23, and therefore the entire switching regulator, commences to operate and generates the DC tag power signal of +5 volts DC. As described below is greater detail, when the DC tag power signal is received by the remainder of the responder tag 14 electronics the uniquely coded information field is generated for inductive coupling into an adjacent interrogator means.

In the responder tag means 52 shown on FIG. 5 where the responder tag power supply 66 is utilized to provide a self-powered tag it can be seen that if the power field receiver coil 22″ is omitted, the DC tag power signals of +5 volts DC are continuously generated and thus the uniquely coded information field is continuously generated. If both the responder tag power supply 66 as well as the power field receiver coil 22″ are utilized in the same responder tag then cyclic generation of the uniquely coded information field occurs as above described for the responder tag incorporating only the power field receiver coil 22″ due to the inhibiting action provided by the cyclic presence and absence of the predetermined voltage at the cathodes of transistors 206 and 208.

Therefore, if the embodiment 50 shown in FIG. 5 is to be utilized wherein the interrogator means 54 does not generate an AC power field, the presence or absence of the power field receiver coil 22″ is unimportant and the DC tag power signal of +5 volts DC is continuously generated for continuous operation of the responder tag 52 due to the presence of the responder tag power supply 66.

If the embodiment 40 shown in FIG. 4 is to be utilized for continuous generation of the AC power field and continuous generation of the uniquely coded information field then the inhibiting action provided by the cyclic presence and absence of a voltage at the cathodes of diodes 206 and 208 must be eliminated in order to allow continuous generation of the DC tag power signals and thus continuous generation of the uniquely coded information field.

Figure 12:
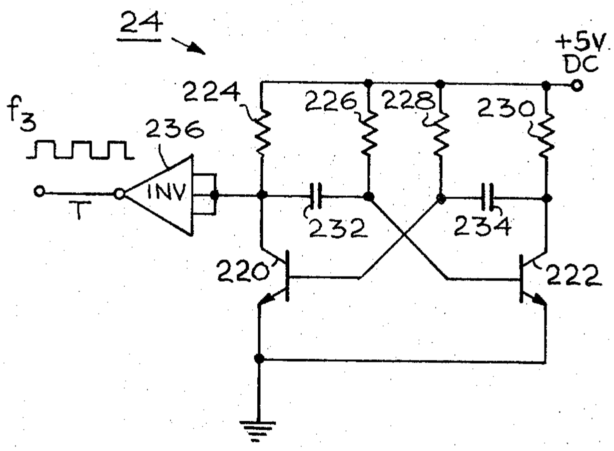
FIG. 12 is a schematic diagram of a code signal time base generator means useful in the practice of the present invention.

FIG. 12 is a schematic diagram of the code signal time base generator 24 of the responder tag 14 shown in FIG. 1. As shown on FIG. 12 the code signal time base generator 24 is powered by the DC tag power signal of +5 volts DC generated in the power field receiver 22. Transistors 220 and 222 together with 224, 226, 228 and 230 and capacitors 232 and 234 comprise an astable multivibrator. The values of resistors 226 and 228 and capacitors 232 and 234 are selected to provide the desired code time base signal frequency $f3$ which, for example, may be 50 kiloHertz at the collector of transistor 220. The signal is fed into an inverter 236 to provide the code time base signal, indicated by the letter T on FIG. 12 at the frequency $f3$ that is utilized to provide a clock for the code signal generator 26.

Figure 13:
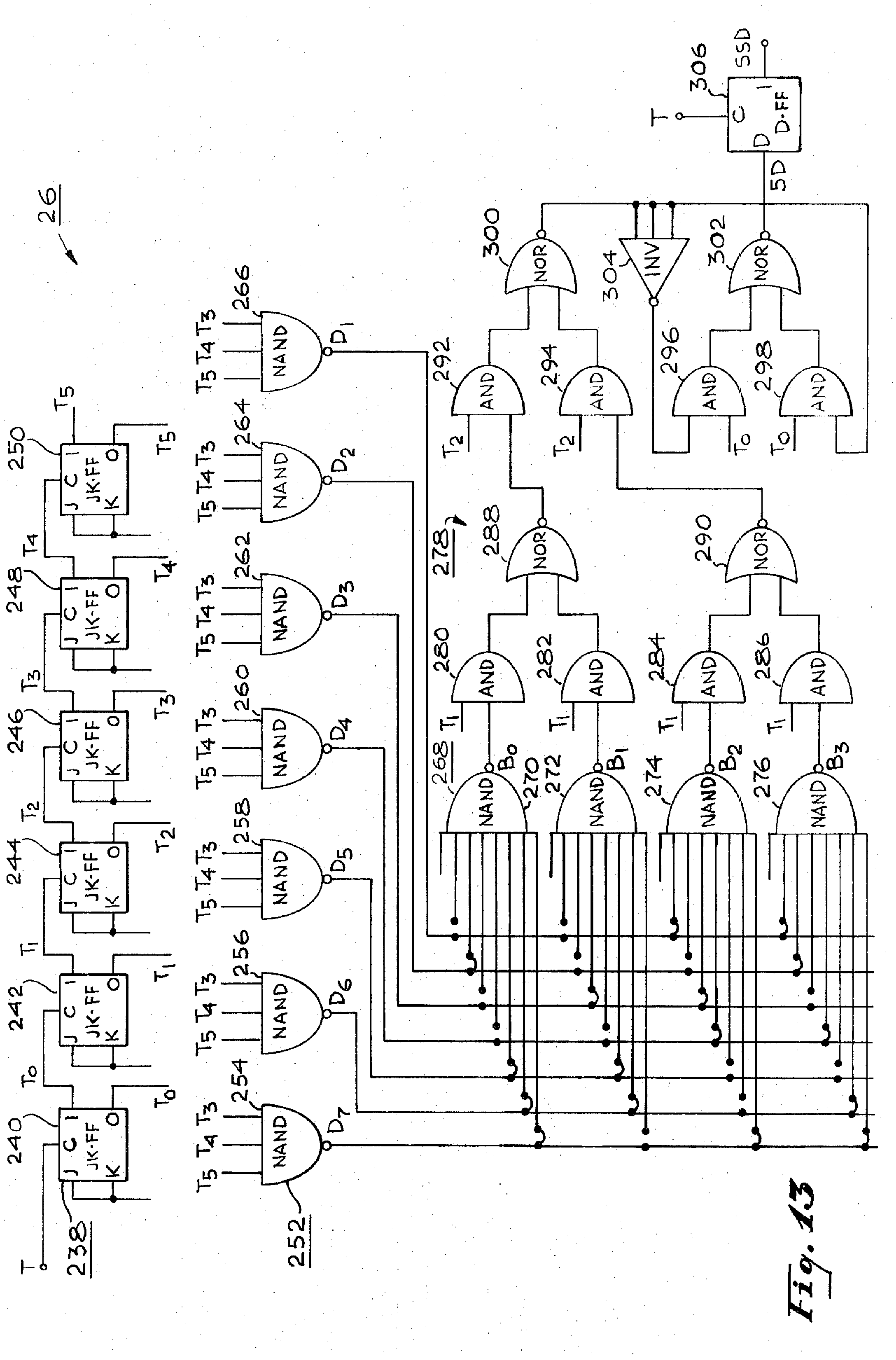
FIG. 13 is a schematic diagram of a code signal generator useful in the practice of the present invention.

FIG. 13 illustrates a prefered embodiment of the code signal generator 26. The code time base signal T is coupled into a code signal generator binary ripple timing counter 238 comprised of J/K flip flops 240, 242, 244, 246, 248, and 250. In the particular embodiment of the code signal generator 26 shown on FIG. 13 it is designed for a 32 bit information content signal. However, either greater or less than 32 bits may be utilized according to the principals of the present invention.

The output signals from the binary ripply timing counter 238 are combined in the timing counter decoder 252 comprised of NAND gates 254, 256, 258, 260, 262, 264 and 266 in order to produce the selection signals for the memory of the code signal generator 26. In the embodiment shown of FIG. 13 of the code signal generator 26 the memory consists of the presence or absence of a wired connection between the timing counter decoder 252 output signals and the memory output sense gates 268 comprised of NAND gates 270, 272, 274 and 276. It will be appreciated that while the presence or absence of a wired connection is shown on FIG. 13, other types of memories may be utilized such as fusible links, diode matrices, charge coupled device memories, or other permanent or long term memory devices known to those skilled in the art.

The output signals of the memory sense gates 268 are serialized in the message serializer 278 comprised of AND gates 280, 282, 284, and 286, NOR gates 288 and 290, AND gates 292, 294, 296 and 298, NOR gates 300 and 302, and inverter 304. The output signal, shown on FIG. 13 as SD from NOR gate 302 of the message serializer 278 is synchronized in the message synchronization D– flip flop 306 to provide the unique clocked code signal clocked at the frequency of the code time base signal T. The unique clocked code signal output of the code signal generator 26 is indicated on FIG. 13 at the output of flip flop 306 by the legend SSD.

Figure 14:
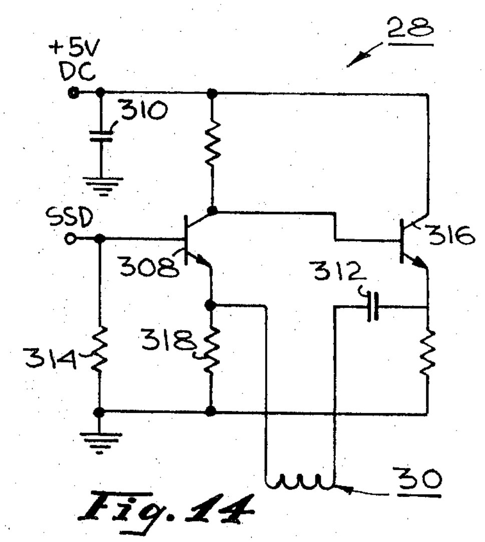
FIG. 14 is a schematic diagram of a coded information signal and time base generator, and a coded information field generator useful in the practice of the present invention.

FIG. 14 illustrates a preferred embodiment of the coded information signal and time base generator means 28 and coded information field generator 30. The coded information signal and time base generator means 28 is powered by the +5 volt DC signal generated in the power field receiver means 22 and also receives the unique clocked code signal, SSD, generated by the code signal generator 26. Basically, the coded information signal time base generator 28 comprises a gated oscillator that is turned off and on by the data pattern which is to be transmitted as contained in the signal SSD. The gated oscillator comprises a Butler oscillator in which the base of transistor 308 is biased at a voltage approximately half way between ground and the +5 volts DC supply voltage. Capacitor 310 is a power supply decoupling capacitor.

In order to permit the coded information field generator comprising a coil 30 and capacitor 312 to be maintained at an initial condition, prior to gating the oscillator "on", which is approximatley equivalent to a normal condition experienced during a steady state oscillation, the initial conditions necessary are:

1. The capacitor 312 is charged to a voltage approximately equal to the peak voltage of the oscillations; and
2. The current in the coded information field generator coil 30 is substantially zero.

These two initial conditions are established by holding the voltage at the base of transistor 308 approximately at ground level through the message synchronizer flip flop 306 of the code signal generator 26 shown in FIG. 13 in the reset state. When the message synchronizer flip flop 306 is in the set state, the base of transistor 308 is approximately 2.7 volts. The resistor 314 is selected so that sufficient current is drawn from the signal SSD to provide this operating potential. The emitter of transistor 308 follows the base to a DC operating point of approximately 2 volts. This is achieved through the comparatively high impedance of the coded information field generator coil 30. Thus, for the message synchronizer flip flop 306 in the set state all operating conditions in the coded information and time base generator 28 are approximately equivalent to one point of the steady state oscillation. Therefore, the oscillator immediately starts into a constant amplitude oscillation. The frequency of oscillation is determined by the inductance value of the coded information field generator coil 30 and the capacitance of capacitor 312. In the embodiment shown on FIG. 14 and as discussed above, these values may be selected to provide an output signal from the coded information field generator means comprising the uniquely coded information field for inductive coupling into an interrogator means of a frequency of approximately 450 kiloHertz.

When the oscillator is to be gated "off", the voltage value of the signal SSD switches to the low or ground state. This cuts off transistor 308 and causes the emitter of transistor 316 to rise to a steady state voltage of approximately 0.7 volts below the +5 volt DC supply voltage. The series circuit comprised of coded information field generator coil 30, capacitor 312 and resistor 318 is thus subjected to a fixed voltage and quickly charges the capacitor 312 to this fixed voltage regardless of the conditions existing at the time transistor 308 was cut off.

Figure 15:
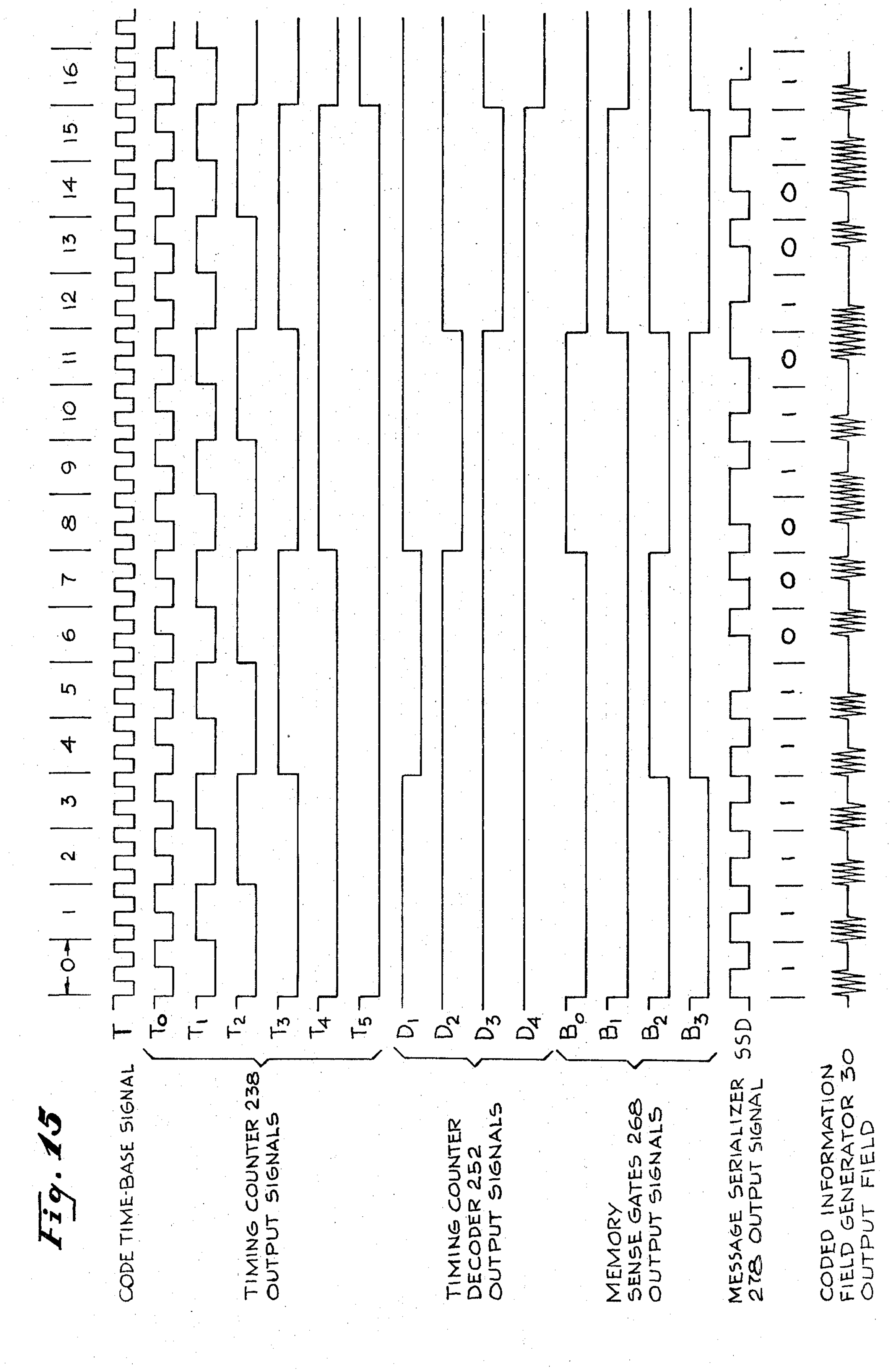
FIG. 15 is a graphical representation of the characteristics associated with the responder tag illustrated in FIG. 1.

FIG. 15 illustrates the wave forms associated with the responder tag 14 described above. As shown on FIG. 15, only the first 16 bits of the total 32 bit transmission in each complete uniquely coded information field transmitted to the interrogator means 12 is illustrated.

It will be appreciated that the specific circuitry described above in connection with the components of the responder tag 14 may be modified to provide the alternate embodiments hereinabove described. Further, those skilled in the art may modify certain of the circuits above described to provide, for example, a higher frequency transmission rate in order to increase the information content in the coded information field in a given time period, utilize other forms of signal coding and transmission techniques such as frequency modulation, phase modulation, or the like, utilize other forms of information formatting such as the use of error detecting and/or correcting codes, pure binary coding, BCD coding, or other coding schemes as desired. The number of bits of information may be increased or decreased from that shown and/or longer or shorter word lengths may be utilized. While the above described embodiment is a 32 bit sequence word that is repeated over and over until the responder tag stored energy is dissipated, in some cases fewer bits or more bits may be required depending upon the application. Additionally, as noted above, external control for a portion of the message, as shown in the block diagram of FIG. 8, may be utilized to indicate, for example, the status or condition of a vehicle such as a police vehicle, taxi cab, bus or the like. Additionally, if desired, the responder tag may be modified to provide initialization of the responder tag code logic in order to start the transmission of the unique clocked code signal generated in the code signal generator 26 at a specific bit in the code rather than at a random bit as illustrated above.

Figure 16:
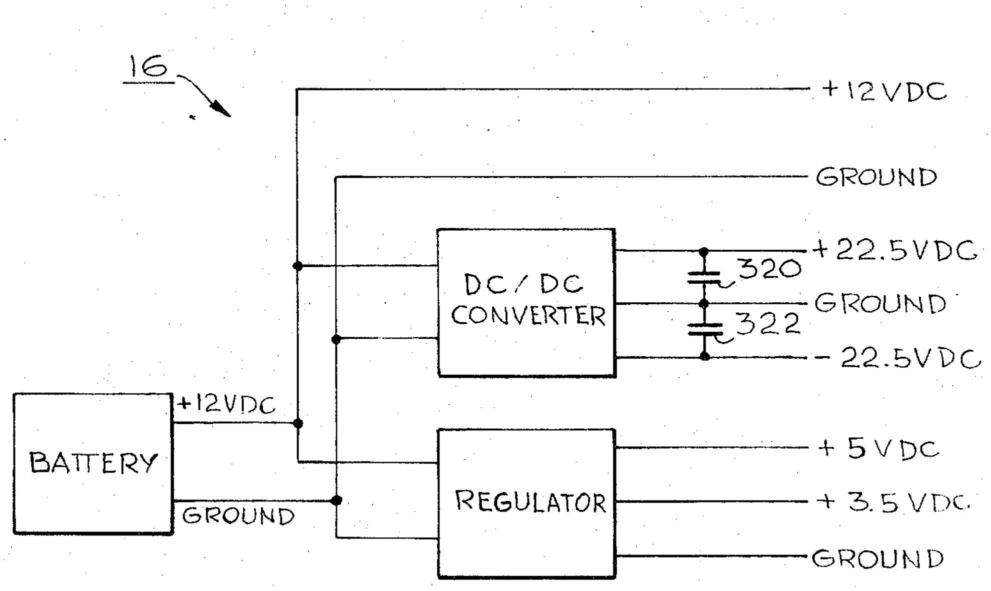
FIG. 16 is a block diagram, partically in schematic diagram form, of a power supply useful in the practice of the present invention.

FIG. 16 illustrates, in block diagram form, a power supply 16 useful in the practice of the present invention as the power supply for the interrogator 12. The power supply 16 shown on FIG. 16 shows the source of electric energy being from a battery. It will be appreciated that those skilled in the art may easily vary the components where a fixed source of alternating current is available to power the interrogator 12. The power supply 16 provides the necessary DC interrogator power signals of 12 volts DC, +22.5 volts DC, ground, −22.5 volts DC, +5 volts DC and +3.5 volts DC. The capacitors 320 and 322 are comparatively large capacity capacitors in order to supply the high current pulses demanded by the power signal portion of the power signal and time base generator 18. Thus, the +12 volts DC, ground, +22.5 volts DC, −22.5 volts DC, +5 volts DC and +3.5 volts DC comprise the controlled electric energy utilized for powering the other components of the interrogator 12.

Figure 17:
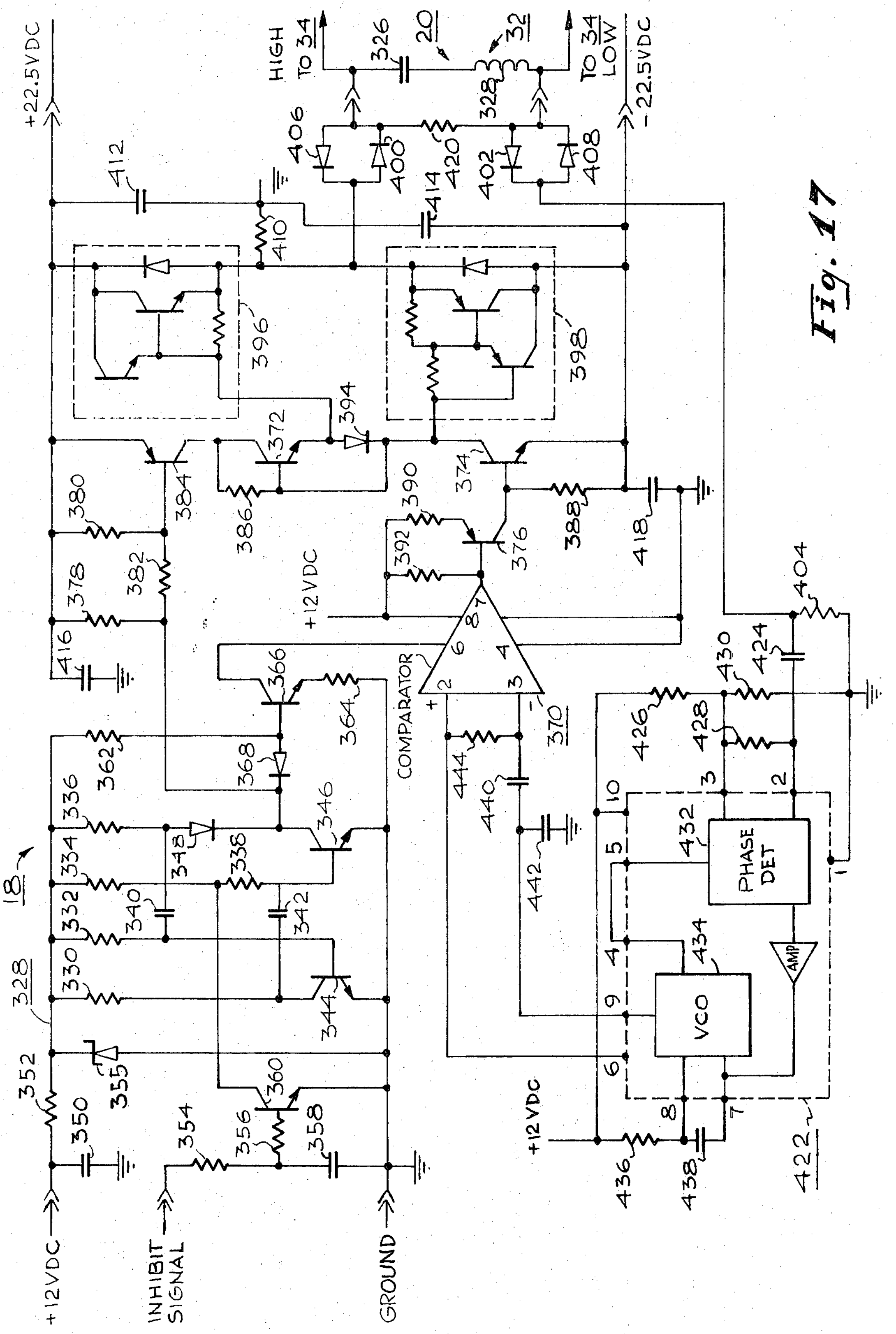
FIG. 17 is a schematic diagram of a power signal time base generator means useful in the practice of the present invention.

FIG. 17 is a schematic diagram of the power signal and time base generator 18, power field generator 20 and coded information field receiver 32 of the integrator 12. In the embodiment illustrated on FIG. 17 the power field generator 20 and the coded information field receiver 32 comprise the single coil 324 and capacitor 326. Thus, this embodiment operates in the two operating modes shown on FIG. 3 described above.

As shown on FIG. 17 the power signal and time base generator 18 is generally comprised of an astable multivibrator 328. The astable multivibrator 328 is comprised of resistors 330, 332, 334, 336 and 338, capacitors 340 and 342, transistors 344 and 346, and diode 348. The astable multivibrator 328 controls the duty cycle, that is, the on-time and off-time of the power signal generator 18.

Capacitor 350 provides local decoupling for the +12 volt DC power supply signal.

Resistor 352 and diode 354 provide a regulated +5 volt DC power signal for the astable multivibrator 328 and is derived from the +12 volt DC power signal.

Resistor 354, resistor 356, capacitor 358 and transistor 360 provide a means to inhibit the astable multivibrator in order to conserve power. This is particularly useful where the power supply is a battery such as that illustrated in FIG. 16. The inhibit signal is derived from the information capture and validation logic means 36, as described below in greater detail. When the inhibit signal is low, for example at ground, the astable multivibrator 328 operates. When the inhibit signal is high, for example at +5 volts DC, the astable multivibrator stops operation. The astable mutlivibrator 328 operates to generate an AC power signal and is inhibited from operation whenever a valid message is received in the information capture and validation logic means 36.

Resistors 362 and 364 together with transistor 366 and diode 368 provide a strobe signal to differential amplifier 370. The strobe signal fed into pin 6 of the differential amplifier 370 was generated by the above components such that for the condition of transistor 346 in an "on" condition, transistor 366 is off the differential amplifier 370 passes a signal at the output pin 7 thereof. For the condition of transistor 346 "off" and transistor 366 "on", differential amplifier 370 does not generate an output signal at pin 7 thereof.

Transistors 372, 374 and 376 provide a power preamplifier and resistors 378, 380 and 382 together with transistor 384 provide a hold off and enable signal for the power preamplifier. For the condition of transistor 346 on, transistor 384 is "on" and the power preamplifier passes an enable signal. For the condition of transistor 346 "off", transistor 384 is also "off" and the power preamplifier does not pass the signal to define the hold off condition.

Resistors 386, 388, 390 and 392 together with the power preamplifier comprised of transistors 372, 374 and 376, and diode 394 provide a power preamplifier for the signal output of differential amplilfier 370 and it also provides a push-pull drive for the power amplifier devices 396 and 398.

For the condition that the differential amplifier 370 is generating an output signal at the output pin 7 thereof, and the differential amplifier 370 output signal is high, both transistors 374 and 376 are "off", thereby holding power amplifier 398 "off", but transistor 372 is "on", which turns on power amplifier 396. For the condition of transistor 372 "on" current flows through diode 400 through the coil 324, through diode 402 and through resistor 404 to ground.

For the condition that differential amplifier 370 is generating an output signal at the output pin 7 thereof and the output signal is low, transistors 376 and 374 are "on", thereby turning power amplifier 398 on and transistor 372 is on, thereby holding power amplifier 396 off since transistor 374 is also on, current flows through diode 406 through the coil 324, through diode 408 and through resistor 404 to ground.

For the condition of differential amplifier 370 having no output signal at the output pin 7 thereof, transistor 384 is "off" and thus no current flows through either power amplifier 396 or 398. Since a small leakage current may still flow through the power amplifiers 396 and 398 under these conditions, resistor 410 is provided as a leakage path to ground.

Capacitors 412 and 414 are local power supply decoupling capacitors for the power amplifiers 396 and 398.

Capacitor 416 and capacitor 418 are local decoupling capacitors for the power preamplifier described above.

Diodes 400, 402 and 406 and 408 provide isolation of the interrogator coil means 324 as well as the coded information signal detector 34 shown in FIG. 1 from the comparatively high capacity of power amplifiers 396 and 398. Resistor 420 provides a damping and discharge path for the capacitor 326 and coil means 324.

The coil means 324 is tuned, together with the capacitor 326 for series resonance at the frequency *f*1 which, for example, may be approximately 50 kiloHertz. Therefore, they present a minimum impedance and consequently draw maximum current therethrough to provide a maximum intensity AC power field generated in the AC power field generator comprised of coil 324. Also, as a result of series tuning, the current flow through the coil 324, as well as through the sense resistor 404 is sinusoidal even though it is being delivered from power amplifiers 396 and 398 which generate a square wave voltage. Also, as a result of series tuning as described above, the current flow through the coil means 324 and therefore through the sense resistors 404 is in phase with the square wave voltage output signals provided by the power amplifier 396 and 398 when the coil is operating at the resonant frequency.

Resistor 404 is a sense resistor for the coil 324 and creates a signal to drive the phase locked loop 422. Capacitor 424 provides a phase correction for the phase locked loop 422 and resistors 426, 428 and 430 provide the DC bias for the phase locked loop 422.

A phase locked loop 422 provides a controlled feedback loop to maintain operation at the resonant frequency of the series tuned interrogator coil 324. The phase detector 432 in the phase locked loop 422 provides a DC voltage proportional to the phase difference of the signals at pin 2, which is the sense resistor 404 sensed current, and pin 5 which is a voltage controlled oscillator output voltage. The DC voltage thus generated by the phase detector 432 controls the voltage controlled oscillator 434 in the phase locked loop 422. The frequency of the voltage controlled oscillator 434 is thereby controlled to provide zero phase error between signals at pin 2 and 5. Since the output of the voltage controlled oscillator 434 at pin 9 also provides the input signal to the differential amplifier 370 negative terminal at pin 3 thereof and subsequently to the power amplifiers 396, 398, which provide the voltage to drive the coil 324, the entire loop locks to the resonant frequency of the interrogator coil 324. By locking to the resonant frequency of interrogator coil 324 the current through the interrogator coil 324 is maximized and therefore the maximum AC power field is generated by the coil 324.

Resistor 436 together with capacitor 438 provide tuning for a nominal frequency of the voltage controlled oscillator 434.

Capacitors 440 and 442 together with resistor 444 and differential amplifier 370 provide a zero crossing detector for the output of the voltage controlled oscillator 434. The positive input at pin 2 of differential amplifier 370 is a DC reference signal related to the output voltage of the voltage controlled oscillator 434. Capacitors 440 and 442 and resistor 444 provide a phase correction for the negative input signal at pin 3 of differential amplifier 370. Differential amplifier 370 thus provides a square wave output with a zero crossings at the time of coincidence of the pin 2 and pin 3 input signals for the condition of the differential amplifier 370 receiving a strobe signal, as above described, at pin 6 thereof.

Figure 18:
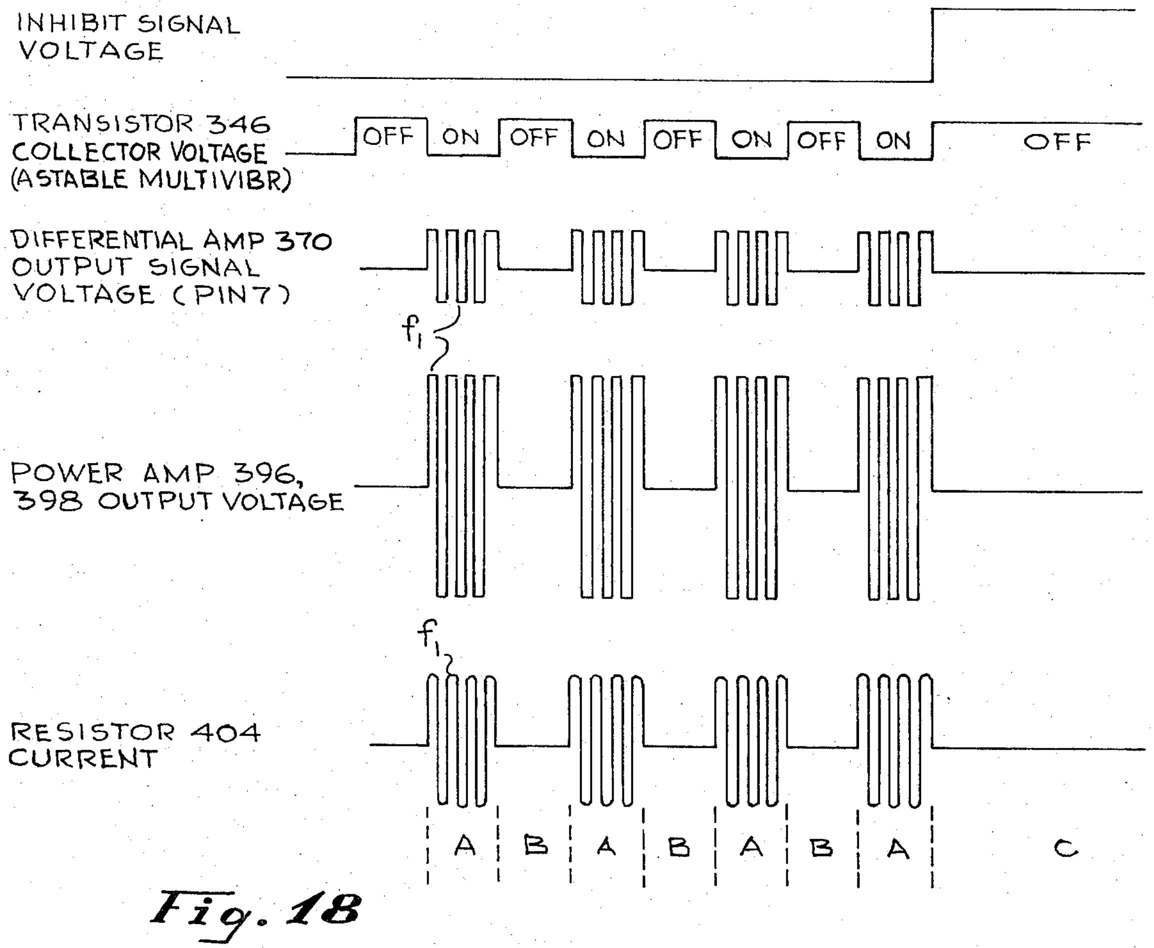
FIG. 18 is a graphical representation of the characteristics of the power signal and time base generator shown in FIG. 17.

FIG. 18 illustrates the wave forms associated with the power signal and time base generator 18 illustrated in FIG. 17. As shown on FIG. 18 during the time periods marked A current flows through the coil 324 to generate the AC power field for inductive coupling into the responder tag 14. During the time periods marked B no current flows through the coil 324 and no AC power field is generated. During these time intervals marked B the coil means 324 is listening for an uniquely coded information field inductively coupled thereto from a responder tag 14 that may be in the proximity of the interrogator 12. The cyclic frequency of the time intervals A and B is governed by the astable multivibrator 328 described above. During the time interval C an inhibit signal has been received by the power signal and time base generator 18 from the information capture and validation logic means 36 indicating the presence of an uniquely coded information field at the frequency *f*2. Inhibit signal rises to the high value and, as described above, this also disables the generation of the AC power field by turning transistor 346 off.

The AC power field remains off until the inhibit signal drops to its low value and the cyclic operation of the astable multivibrator 328 again commences.

As noted above, in the embodiment 10 of the present invention the coil 324 serves as both the AC power field generator 20 and the coded information field receiver 32. Thus, during the time interval A the coil 324 is operating as the AC power field generator 20 and during time interval B it is operating as the coded information field receiver 32.

The differential amplifier 370, power amplifier 396 and 398 and phase locked loop 422 may be solid state devices in the preferred embodiment of the present invention. For example, differential amplifier 370 may be a national semiconductor type LM311, power amplifier 396 may be a Motorola NPNMJ4035, power amplifier 398 may be a Motorola PNPMJ4032 and phase locked loop 422 may be a Signetics NE565.

As noted above, in the embodiment 10 shown on FIG. 1 the coil 324 operates during the time period A as the AC power field generator 20 and during time intervals B and C as the coded information field receiver means 32. It will be appreciated, however, that by supplying a separate capacitor similar to capacitor 326 and a separate coil, the interrogator 42 of the embodiment 40 shown in FIG. 4 could be provided. That is, in the embodiment of the power signal time base generator 12 shown in FIG. 17 the capacitor 326 and coil 324 also provide lead for inputs to the coded information signal detector means 34.

Figure 19:
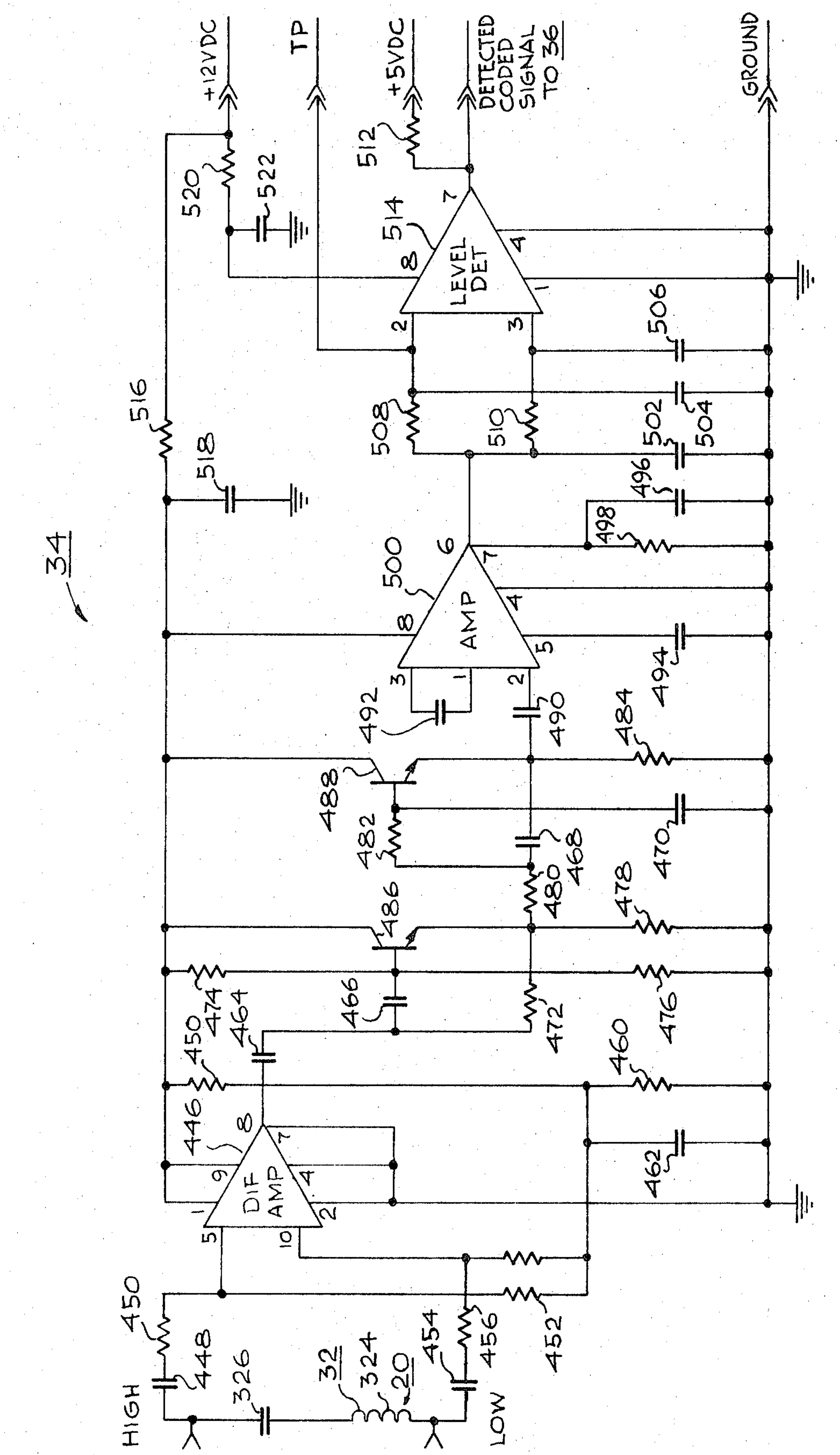
FIG. 19 is a schematic diagram of a coded information signal detector useful in the practice of the present invention.

FIG. 19 illustrates a coded information signal detector 34 as shown in FIG. 1 and utilizing the same coil 324 and capacitor 326 utilized as the AC power field generator means 20. The coded information signal detector 34 has a high and low input across the capacitor 326 and coil 324. Differential amplifier 446 provides differential amplification for the detected presence of the uniquely coded information field in the coded information field receiver 32 between the high input and low input therefrom and provides noise rejection performance therein. Capacitor 448 and resistors 450 and 452 provide input isolation and attenuation in the uniquely coded information signal high input and capacitor 454 and resistors 456 and 452 provide input isolation and attenuation for the uniquely coded information signal low terminal. Thus, during the time interval C of FIG. 18 when a signal is being received by the coded information field receiver 32 comprised of the coil 324 a voltage signal is generated thereacross and, as noted above, the high input signal therefrom is applied to pin 5 of differential amplifier 446 and the low input signal is applied to terminal 10 of differential amplifier 446.

Resistors 458 and 460 together with capacitor 462 provide DC and AC bias for the above-mentioned input isolation and attenuation circuits.

Capacitors 464, 466, 468 and 470 together with resistors 472, 474, 476, 478, 480, 382 and 484, and transistors 486 and 488 are an active filter network providing a bandpass at the frequency *f*2 of the coded information field. For example, as noted above, this frequency may be approximately 500 kiloHertz. Capacitor 490 is an AC coupling capacitor.

Capacitors 492, 494 and 496 together with resistor 498 as connected to comparator 500 provide amplitude modulation detection and amplification with automatic gain control.

Capacitors 502, 504 and 506, with resistors 508, 510 and 512, as connected to comparator 514 provide signal level detection. Resistor 510 and capacitor 506 provide a long time constant to establish a reference level voltage of the signal for comparison. Resistor 508 and capacitor 504 provide a short time constant to pass the signal whose level is to be detected. Resistor 512 provides a pull up path for the level detector 514 output signal at pin 7 thereof. Resistor 516 and capacitor 518 provide local power supply decoupling for differential amplifier 446, comparator 500, and transistors 486 and 488.

Resistor 520 and capacitor 522 provide local power supply decoupling for level detector 514.

It will be appreciated that the differential amplifier 446, comparator 500 and level detector 514 may be solid state devices such as integrated circuit chips. For example, differential amplifier 446 may be an RCA CA 3022, comparator 500 may be a National LM372 and level detector 514 may be a National LM311.

Thus, the circuity of the coded information signal detector 34 shown on FIG. 19 is a highly sensitive AM receiver with differential signal input operating at a carrier frequency of *f*2, which as noted above may be on the order of 500 kiloHertz, detecting an information frequency of *f*3 which, as noted above, may be on the order of 50 kiloHertz.

Figure 20:
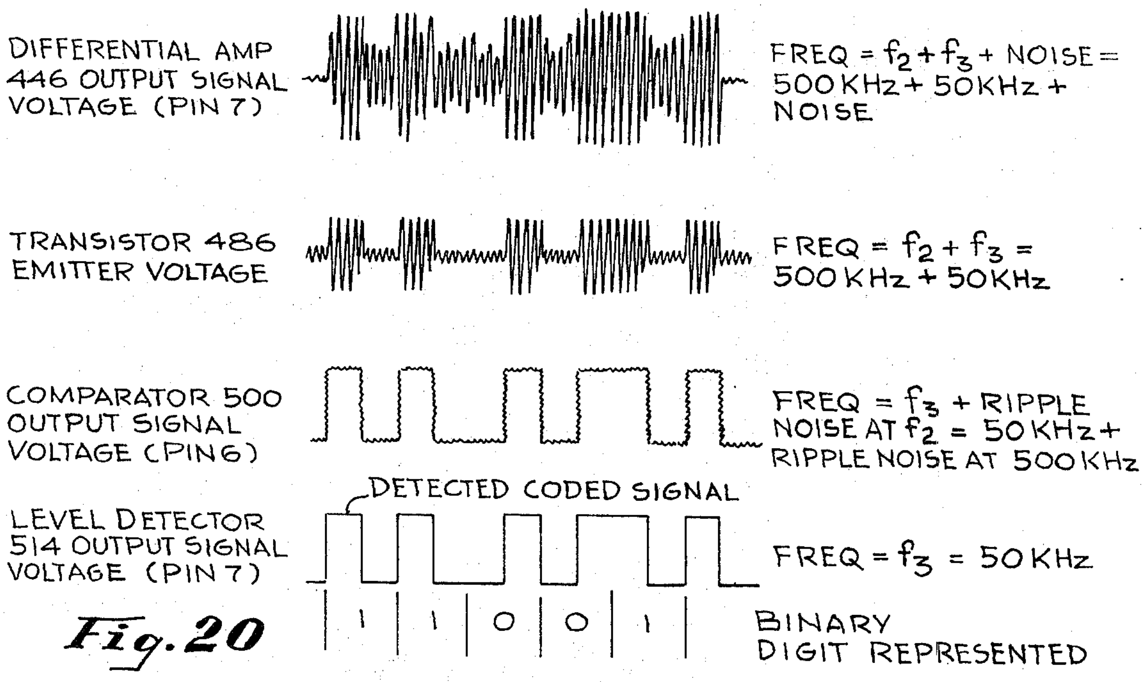
FIG. 20 is a graphical representation of the wave forms assocaiated with the coded information signal detector shown in FIG. 19.

FIG. 20 illustrates the wave forms associated with the coded information signal setector 34 shown in FIG. 19.

Figure 21:
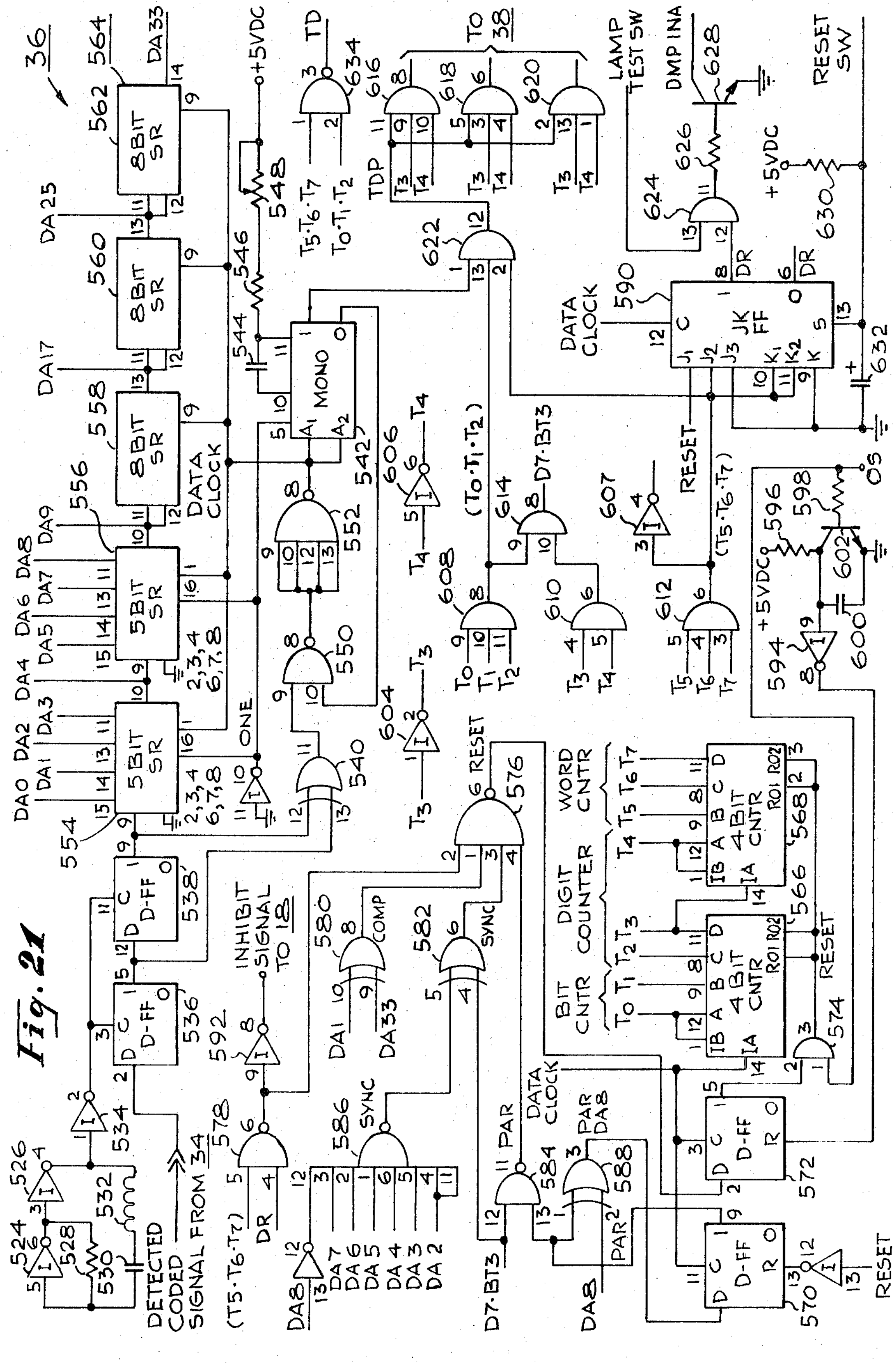
FIG. 21 is a schematic diagram of an information capture and validation logic means useful in the practice of the present invention.

The detected coded signal which is the output signal at pin 7 from the level detector 514 is coupled into the information capture and validation logic means 36 which is shown in schematic diagram form on FIG. 21.

Inverters 524 and 526 together with resistor 528, capacitor 530 and inductor 532 provide an oscillator producing a square wave clock signal at a 1 megaHertz frequency. This square wave clock signal is fed into pin 1 of inverter 534 and the inverted clock signal from the output pin 2 of inverter 534 is utilized to clock the two signal synchronization flip flops 536 and 538.

The detected coded signal from coded information signal detector 34 is applied to input pin 2 of flip flop 536 and is clocked in by a positive transistion in the output signal at pin 2 of inverter 534. The output signal of flip flop 536 at pin 5 is applied to the input at pin 12 of flip flop 538. The signal at pin 12 of flip flop 538 is clocked in 1 microsecond after the input signal to flip flop 536 by the next successive positive transition of the output signal at pin 2 of inverter 534 which is applied at pin 11 of flip flop 538. By comparing the output signals of flip flops 536 and 538 in an exclusive OR gate 540 it may be determined when the detected coded signal received from the coded information signal detector 34 changes state. A 1 microsecond pulse is thus produced at the output pin 11 of exclusive OR gate 540 each time a transition is determined.

Multiple transitions in the detected coded signal from coded information signal detector 34 are prevented from producing erroneous clocks by inclusion of a 1 shot monostable multivibrator 542 which has a pulse width of 30 microseconds or ¾ of the data bit period contained in the detected coded signal. The 30 microsecond period is determined by the values of capacitor 544, resistor 546 and variable resistor 548. The 5 volt DC signal is utilized to power the monostable multivibrator 542.

If the monostable multivibrator 542 is reset, that is NAND gate 550 is a logical 1 at pin 10 thereof, each 1 microsecond pulse at exclusive OR gate 540 pin 11 produces a 1 microsecond pulse at NAND gate 552 pin 8. The signal at pin 8 of NAND gate 552 is called the data clock on FIG. 21. If the monostable multivibrator 542 is set, that is pin 10 of NAND gate 550 is a logical zero, no pulse appears at pin 8 of NAND gate 552.

The negative transition of a data clock pulse starts the monostable multivibrator 542 1 shot, and this inhibits any further transitions from producing data clocks for 30 microseconds. Utilization of the above-described technique for eliminating any multiple transmissions in the detected coded signal from coded information signal detector 34 also eliminates the normal second transition which occurs when consecutive ones or consecutive zeros are transmitted. Further, the above-described logic is synchronized by the transmission of a 1–0 pair. Under such a condition only one transition is produced in a given bit period and the 1 shot monostable multivibrator returns to the reset condition before the next sequential valid clocked transition occurs.

The synchronized output signal at pin 9 of flip flop 538 is applied to the input pin 9 of 5 bit shift register 554 and is clocked in by the positive transition of the data clock pulse applied at pin 1 thereof. Thus, the data just prior to a transition occurring in the detected coded signal is shifted into the 5 bit shift register 554. Any further transitions are ignored for the 30 microsecond period providing a high degree of noise rejection.

Five bit shift register 554 together with 5 bit shift register 556 and 8 bit shift registers 558, 560 and 562 comprise a 34 bit serial data register 564 which captures the continuous 30 bit message transitted from the responder tag 14 and as appearing in the detected coded signal from coded information signal detector 34. As noted above, it will be appreciated that any desired number of bits may be incorporated in the uniquely coded information field and the corresponding mechanizations similar to that shown on FIG. 21 for either greater or less than 32 bits in a complete message may easily be made by those skilled in the art.

The data in the serial data register 564 is validated prior to transmitting the data to the information storage display or communication means 38. Validation in the information capture and validation logic means 36 shown on FIG. 21 consists of subjecting the data in the serial data register 564 to four specific tests.

The first test is a bit-for-bit comparison of the data entering the serial data register 564 with the data that has entered the serial data register 564 32 bit period earlier.

The second test is detection of a valid synchronization sequence pattern contained in the transmission from the responder tag 14. The synchronization sequence for this embodiment comprises a zero followed by six consecutive ones. It will be appreciated that any other desired synchronization patter may be utilized.

The third test consists of detection of valid parity. Each word consisting of 32 bits must have even parity for the embodiment shown in FIG. 21.

The fourth test consists of detection of the time between data clocks to be less than a predetermined time period. For the embodiment shown in FIG. 21 this may be approximately 100 microseconds.

The validity of the data in the detected coded signal from coded information signal detector 34 is indicated by permitting bit, digit and word timing counters 566 and 568 to increment as long as an invalid condition is not detected. When counters 566 and 568 reach a specified final state, which, for example, may comprise 8 consecutive valid 32 bit word transmissions of the uniquely coded information field as provided in the detected coded signal from coded information signal detector 34, the transfer of data in the serial data register 564 to the information storage display or communication means 38 is permitted and the inhibit signal for inhibiting further generation of the AC power field by the power signal and time base generator 18 is provided. Whenever an invalid condition is detected the timing counters 566 and 568 are reset to zero and the process is allowed to repeat until the responder tag 14 ceases transmission of the uniquely coded information field or the final state of the counters 566 and 568 is achieved.

The timing counters 566 and 568 and a parity flip flop 570 are reset in the first bit time following the detection of an invalid condition or the final state of the timing counters 566 and 568. The reset condition is held in a controlled flip flop 572 and the state of the controlled flip flop 572 is anded with the data clock pulse from the monostable multivibrator 542 to provide a reset pulse at pin 3 of AND gate 574. The input to the control flip flop 572 is provided by the output at pin 6 of NAND gate 576. The signal appearing at the pin 6 of NAND gate 576 is the logical OR of the detection of the final state of the NAND gate 578 appearing at pin 6 thereof, detection of a bit-for-bit comparison error at pin 8 of exclusive OR gate 580, detection of an invalid synchronization condition at pin 6 of exclusive OR gate 582 or detection of a parity error at pin 11 of NAND gate 584.

Synchronization is determined by the condition of the output signal from NAND gate 586 which is the logical AND of six consecutive bits in the serial data register 564 and is comprised of the signals DA2, DA3, DA4, DA5, DA6 and DA7, and the inversion of the seventh consecutive bit, DA8, inverted through inverter 588. A synchronization error is detected in the exclusive OR gate 582 whenever an out-of-synchronization condition exists during a bit time D7.BT3 or a synchronized condition exists at a time other than DC.BT3.

The parity condition is stored in flip flop 570. Flip flop 570 is initially reset at the same time as the timing counters 566 and 568 are reset. Flip flop 570 changes state each bit time during which a logical 1 is present in the serial data register 564 by means of an exclusive OR gate 588. A parity error is detected in the NAND gate 584 by examining the state of the parity flip flop 570 during bit time DC.BT3. Proper even parity is achieved if an even number of logical 1s is detected in the serial data register 564 during the period of 32 bit times. The parity bit in the message is originally selected to force the number of logical 1s in the message to be even.

Bit-for-bit comparison is determined by an exclusive OR gate 580 by continuously comparing bits in the serial data register 564, which are 32 times apart. Whenever the comparison bits are different, a comparison error is produced.

The final state of the timing counters 566 and 568 are determined by NAND gate 578 which produces a timing counter reset condition signal whenever the eighth consecutive valid word has been detected or the display reset flip flop 590 has been set. The output at pin 6 of NAND gate 578 is also inverted through inverter 592 to provide the inhibit signal that is coupled to the power signal time base generator 18 which prevents the generation of the AC power field for the condition of a valid transmission received by the coded information field receiver 32.

The clock interval time is determined by inverter 594 and time constant network comprised of resistors 596 and 598, capacitor 600 and transistor 602. Each data clock pulse causes transistor 602 to discharge capacitor 600. If the time between data clock pulses exceeds approximately the above-mentioned microseconds, capacitor 600 charges to a voltage which produces a reset pulse at pin 8 of inverter 594.

Inverters 604, 606 and 608 together with AND gates 608, 610, 612 and 614 provide decoding and timing functions derived from the timing counters 566 and 568.

Transfer of information to the information storage, display or communications means 38 is accomplished through three display clock AND gates 616, 618 and 620. Each of the three display clock gates is enabled by the transfer to display signal generated at pin 12 of AND gate 622. These three display clock AND gates 616, 618 and 620 provide the proper timing to permit synchronized parallel transfer of 8 bit segments from the serial data register 564.

A display reset control is provided by flip flop 590 which is set during power turn on or by activating a reset switch (not shown in FIG. 21) to generate a signal therefrom provided at pin 13 of flip flop 590. During the eighth valid message transmission, flip flop 590 is reset which allows transmission to the information storage display or communications means 38. If an invalid condition is detected during, for example, the eighth message transmission, the flip flop is set again thus preventing transfer.

If desired, a lamp test switch (not shown on FIG. 21) may be provided to generate a signal at the lamp test switch pin 13 of AND gate 624 which is connected at pin 12 to pin 8 of flip flop 590 and the output at pin 11 is connected through resistor 626 to transistor 628. The reset swtich circuit also comprises resistor 630 and capacitor 632 and resistor 630 is connected to the +5 volts DC power signal.

Figure 22:
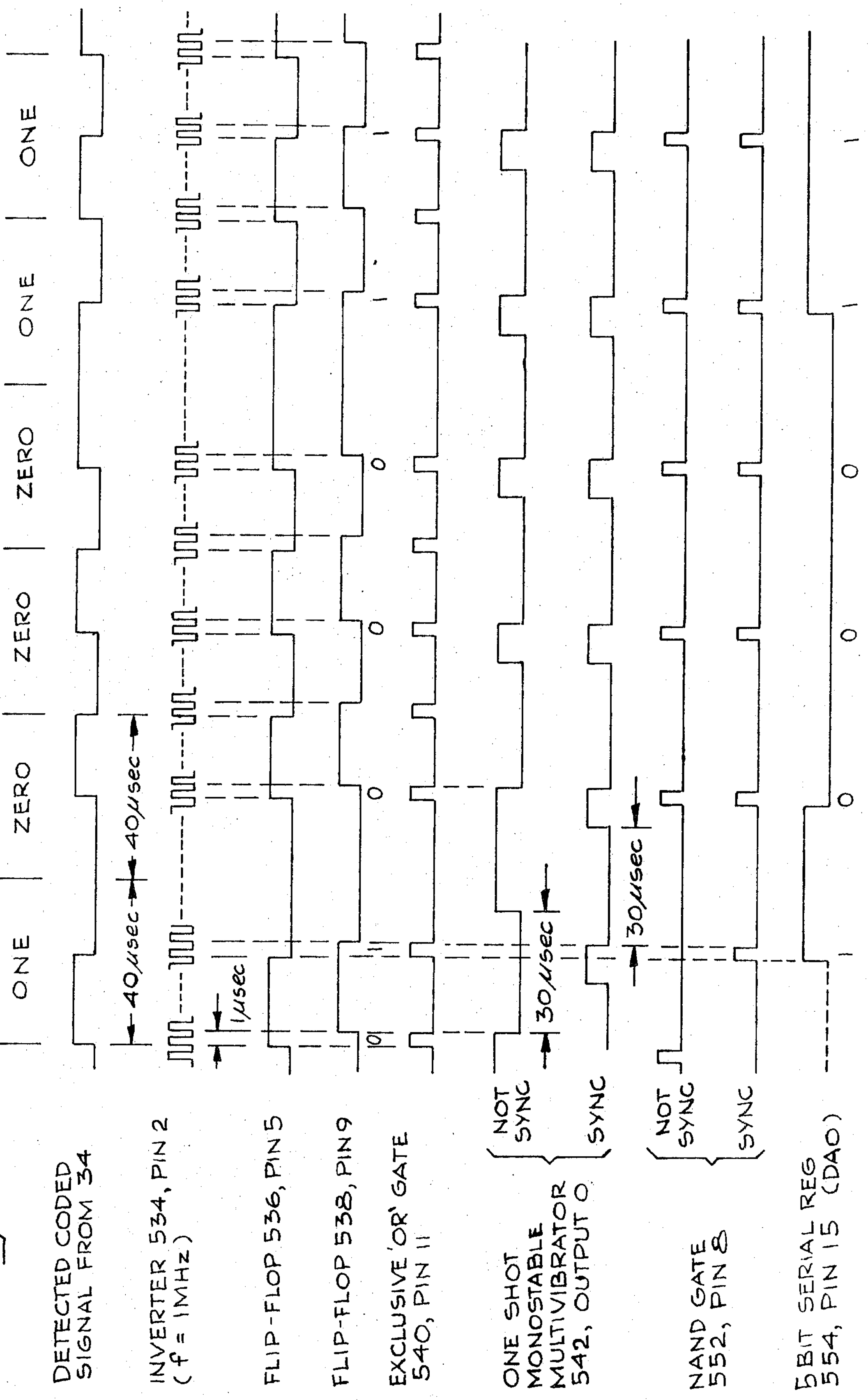
FIGS. 22 and 23 are graphical representation of the characteristics associated with the information capture and validation logic means illustrated in FIG. 21.
Figure 23:
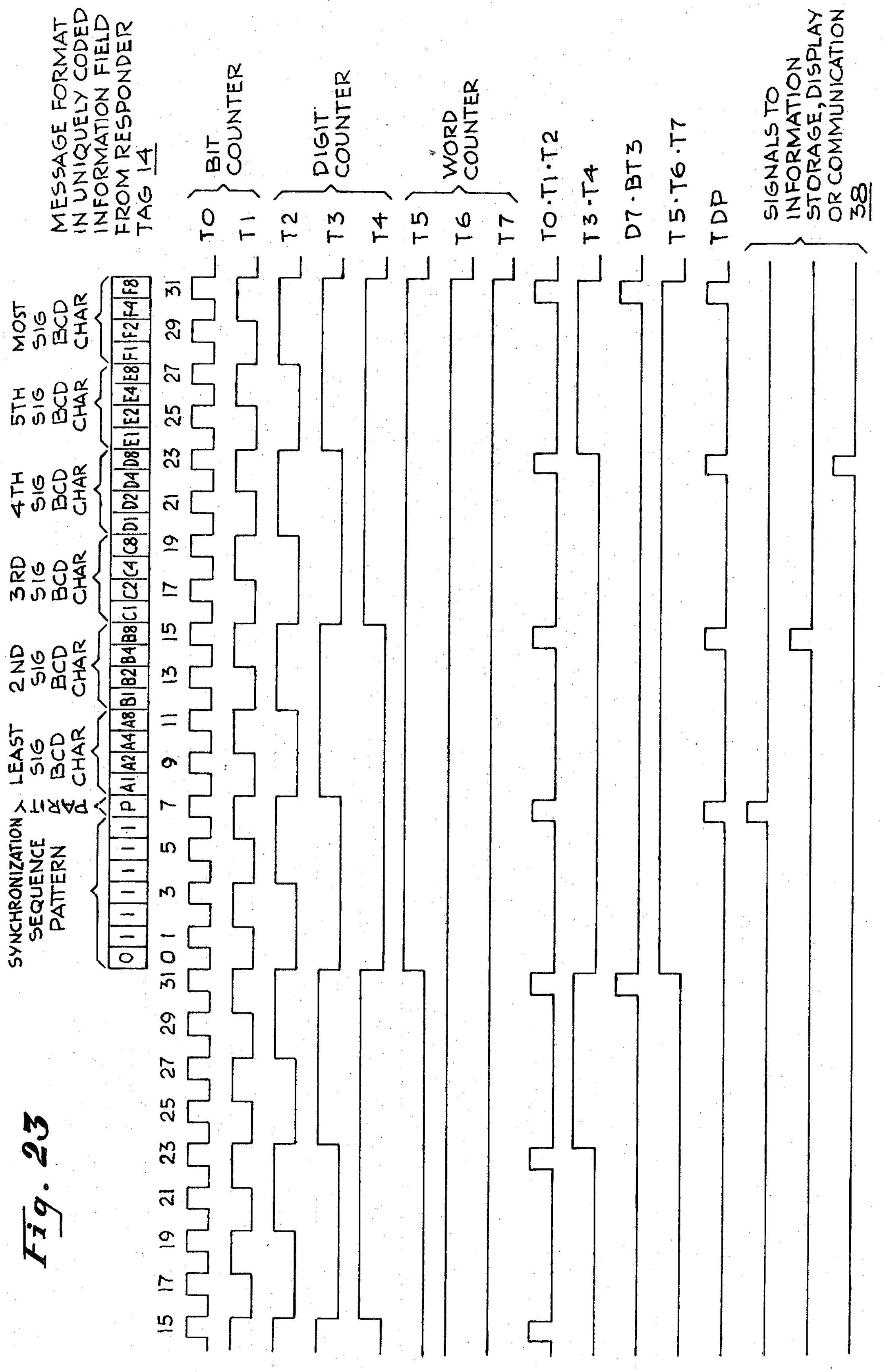

FIGS. 22 and 23 illustrate wave forms associated with the structue illustrated in FIG. 21.

From the above it can be seen that there has been provided an improved inductively coupled interrogator-responder tag arrangement in which at least the uniquely coded information field generated in the responder tag is transmitted for inductive coupling to the interrogator. In some of the embodiments the power for the responder tag may be inductively coupled thereto from an AC power field generated in the interrogator.

Those skilled in the art may find many variations and adaptations of the interrogator-responder tag arrangement described above. It will be appreciated that all such variations and adaptations falling within the scope and spirit of the present invention are intended to be covered by the appended claims.

We claim:

1. An interrogator-responder system for providing an output signal having an information content corresponding to an uniquely coded information field of a responder, said uniquely coded information field generated in said responder and comprising, in combination:

an interrogator means for establishing an AC power field at a first frequency and receiving said uniquely coded information field, and generating said output signal in response thereto;

a responder tag means positionable in AC power field and uniquely coded information field energy exchange relationship to said interrogator means for receiving said AC power field and generating said uniquely coded information field at a second frequency in response thereto;

said interrogator means comprising:

a power supply means for providing a source of controlled electric energy;

a power signal-time base generator means comprising a phase locked loop self timed at said first frequency, receiving said controlled electric energy from said power supply means and generating an AC power signal in response thereto, and said AC power signal comprising a self-timed phase locked power signal at said first frequency;

a power field generator means for receiving said self-timed phase locked power signal at said first frequency and generating said AC power field at said first frequency in response thereto for inductive coupling thereof into said responder tag means;

a coded information field receiver means for receiving said uniquely coded information field from said responder tag means and generating an uniquely coded information signal therein in response thereto;

coded information signal detection means powered by said controlled electric energy, for detecting the existence of said uniquely coded information signal in said coded information field receiver means and generating a detected coded signal in response thereto;

information capture and validation logic means, powered by said controlled electric energy, for receiving said detected coded signal from said coded information signal detection means and generating said output signal having an information content corresponding to said uniquely coded information field in response thereto;

said responder tag means comprises:

power field receiver means for receiving said AC power field from said power field generator means of said interrogator means and providing DC tag power signals in response thereto;

a code signal time-base generator means powered by said DC tag power signals for generating a code time-base signal at a third frequency;

code signal generator means powered by said DC tag power signals and receiving said code time-base signal for repetitively generating an unique clocked code signal clocked at said third frequency of said code time-base signal;

coded information signal and time-base generator means powered by said DC tag power signals for receiving said unique clocked code signal and generating a self-clocking coded information signal unique to said responder tag in response thereto; and coded information field generator means for receiving said self-clocking coded information signal and generating said uniquely coded information field in response thereto for inductive coupling into said coded information field receiver means of said interrogator means.

2. The arrangement defined in claim 1 wherein said interrogator means is operable in a plurality of modes, said plurality of modes comprising:

a first mode comprising an AC power generating mode for generating said AC power field;

a second mode comprising an uniquely coded information field receiver mode for receiving said uniquely coded information field.

3. The arrangement defined in claim 2 wherein:

said power field generator means and said coded information field receiver means comprise a unitary coil means;

said interrogator means further comprising:

switching means for cyclically switching said interrogator between said first mode and said second mode.

4. The arrangement defined in claim 3 wherein said first mode further comprises:

a first power level condition comprising generating said AC power field at a first power level;

a second power level condition for generating said AC power field at a second power level greater than said first power level;

said switching means of said interrogator means further comprises:

presence detector means for detecting the presence of a responder tag in proximity to said interrogator means and generating a presence detection signal in response thereto; and power level switching means for receiving said presence detection signal and switching said interrogator during said first mode of operation between said first power level condition and said second power level condition in response thereto.

5. The arrangement defined in claim 1 wherein said first frequency and said third frequency are on the order of fifty kiloHertz and said second frequency is on the order of four hundred and fifty kiloHertz.

6. The arrangement defined in claim 1 and further comprising:

external message information means coupled to said code signal generator means of said responder tag for supplying an external message thereto, and said external message forming a part of said unique clocked code signal.

7. The arrangement defined in claim 1 wherein:

said power field receiver means of said responder tag means comprises a first tag coil; and said coded information field generator means comprises a second tag coil.

8. The arrangement defined in claim 7 wherein said first tag coil and said second tag coil are substantially coplanar.

9. The arrangement defined in claim 4 wherein:

said unitary coil means of said interrogator means is imbedded in a vehicular roadway a preselected distance beneath the surface thereof; and said responder tag means further comprises:

said power field receiver means comprises a first tag coil; and said electromagnetic coded information field generator means comprises a second tag coil;

and said first tag coil and said second tag coil are coupled adjacent the underside of a vehicle adapted to traverse the surface of said roadway;

said presence detection means further comprises:

means for detecting the presence of a vehicle in proximity to said unitary coil.

10. A responder tag means comprising, in combination:

power field receiver means for receiving an AC power field and providing DC tag power signals in response thereto;

a code signal time base generator means powered by said DC tag power signal for generating a code time-base signal at a preselected frequency;

code signal generator means powered by said DC tag power signals and receiving said code time base signal for repetitively generating an unique clocked code signal clocked at said preselected frequency of said code time base signal;

coded information signal and time base generator means powered by said DC tag power signals for receiving said unique clocked code signal and generating a self-clocking coded information signal unique to said responder tag in response thereto; and coded information generator means for receiving said self-clocking coded information signal and generating uniquely coded information field in response thereto.

11. The arrangement defined in claim 10 and further comprising:

external message information means coupled to said code signal generator means of said responder tag for supplying an external message thereto, and said external message forming a part of said unique clocked code signal.

12. The arrangement defined in claim 10 wherein:

said power field receiver means of said responder tag means comprises a first tag coil; and said coded information field generator means comprises a second tag coil.

13. The arrangement defined in claim 12 wherein:

said first tag coil and said second tag coil are substantially coplanar.

14. An interrogator-responder system for providing an output signal having an information content corresponding to an uniquely coded information field indicative of a responder tag and said uniquely coded information field generated in said responder tag, and comprising, in combination:

an interrogator means for establishing an AC power field at a first frequency and receiving said uniquely coded information field, and generating said output signal in response thereto;

a responder tag means positionable in AC power field and uniquely coded information field energy exchange relationship to said interrogator means, for receiving said AC power field and generating said uniquely coded information field at a second frequency in response thereto, and said responder tag means comprises:

power field receiver means for receiving said AC power field from said power field generator means of said interrogator means and providing DC tag power signals in response thereto;

a code signal time base generator means powered by said DC tag power signals for generating a code time-base signal at a third frequency;

code signal generator means powered by said DC tag power signals and receiving said code time base signal for repetitively generating an unique clocked code signal clocked at said third frequency of said code time base signal;

coded information signal and time base generator means powered by said DC tag power signals for receiving said clocked code signal and generating a self-clocking coded information signal unique to said responder tag in response thereto; and coded information field generator means for receiving said self-clocking coded information signal and generating said uniquely coded information field in response thereto for inductive coupling into said interrogator means.

15. An interrogator-responder system for providing an output signal having an information content corresponding to an uniquely coded information field indicative of a responder tag, and said uniquely coded information field generated in said responder tag, and comprising, in combination:

an interrogator means for establishing an AC power field at a first frequency and receiving said uniquely coded information field, and generating said output signal in response thereto;

a responder tag means positionable in AC power field and uniquely coded information field energy exchange relationship to said interrogator means for receiving said AC power field and generating said uniquely coded information field at a second frequency in response thereto;

said interrogator means comprising:

a power supply means for providing a source of controlled electric energy;

a power signal-time base generator means comprising a phase locked loop self-timed at said first frequency for receiving said controlled electric energy from said power supply means and generating an AC power signal in response thereto, and said AC power signal comprising a self-timed phase locked power signal at said first frequency;

a power field generator means for receiving said self-timed phase locked power signal at said first frequency and generating said AC power field at said first frequency in response thereto for inductive coupling thereof into said responder tag means;

a coded information field receiver means for receiving said uniquely coded information field from said responder tag means and generating an uniquely coded information signal therein in response thereto;

coded information signal detection means powered by said controlled electric energy, for detecting the existence of said uniquely coded information signal in said coded information field receiver means and generating a detected coded signal in response thereto;

information capture and validation logic means, powered by said controlled electric energy, for receiving said detected coded signal from said coded information signal detection means and generating said output signal having an information content corresponding to said uniquely coded information field in response thereto.

16. An interrogator means for establishing an AC power field at a first frequency and receiving and identifying an uniquely coded information field transmitted thereto, and generating an output signal in response to said identified uniquely coded information field, and comprising:

a power supply means for providing a source of controlled electric energy;

a power signal-time base generator means comprising a phase locked loop self-timed at said first frequency for receiving said controlled electric energy from said power supply means and generating an AC power signal in response thereto, and said AC power signal comprising a self-timed phase locked power signal at said first frequency;

a power field generator means for receiving said self-timed phase locked power signal at said first frequency and generating said AC power field at said first frequency in response thereto for inductive coupling into said responder tag means;

a coded information field receiver means for receiving said uniquely coded information field from said responder tag means and generating an uniquely coded information signal therein in response thereto;

coded information signal detection means powered by said controlled electric energy, for detecting the existence of said uniquely coded information signal in said coded information field receiver means and generating a detected coded signal in response thereto;

information capture and validation logic means, powered by said controlled electric energy, for receiving said detected coded signal from said coded information signal detection means and generating said output signal having an information content corresponding to said uniquely coded information field in response thereto.

17. The arrangement defined in claim 16 wherein said interrogator means is operable in a plurality of modes, said plurality of modes comprising:

a first mode comprising an AC power generating mode for generating said AC power field;

a second mode comprising an uniquely coded information field receiver mode for receiving said uniquely coded information field.

18. The arrangement defined in claim 17 wherein:

said power field generator means and said coded information field receiver means comprise an unitary coil means;

said interrogator means further comprising:

switching means for cyclically switching said interrogator between said first mode and said second mode.

19. The arrangement defined in claim 18 wherein said first mode further comprises:

a first power level condition comprising generating said AC power field at a first power level;

a second power level condition for generating said electromagnetic power field at a second power level greater than said first power level;

said switching means of said interrogator means further comprises:

presence detector means for detecting the presence of a responder tag in proximity to said interrogator means and generating a presence detection signal in response thereto; and power level switching means for receiving said presence detection signal and switching said interrogator during said first mode of operation between said first power level condition and said second power level condition in response thereto.

* * * * *